US006952656B1

(12) United States Patent
Cordova et al.

(10) Patent No.: US 6,952,656 B1
(45) Date of Patent: Oct. 4, 2005

(54) WAFER FABRICATION DATA ACQUISITION AND MANAGEMENT SYSTEMS

(75) Inventors: Sherry Cordova, Sunnyvale, CA (US); Terry L. Doyle, Portola Valley, CA (US); Natalia Kroupnova, Sunnyvale, CA (US); Evgueni Lobovski, San Jose, CA (US); Inna Louneva, Palo Alto, CA (US); Richard C. Lyon, Boulder Creek, CA (US); Yukari Nishimura, Sunnyvale, CA (US); Clari Nolet, Los Altos, CA (US); Terry Reiss, San Jose, CA (US); Woon Young Toh, San Jose, CA (US); Michael E. Wilmer, Portola Valley, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/561,440

(22) Filed: Apr. 28, 2000

(51) Int. Cl.[7] .............................................. G06F 19/00
(52) U.S. Cl. ..................................... 702/117; 700/121
(58) Field of Search ..................... 702/122, 117, 188; 710/1; 700/121, 117, 96; 701/1

(56) References Cited

U.S. PATENT DOCUMENTS

| 4,890,239 A | 12/1989 | Ausschnitt et al. ......... 364/491 |
| 5,063,494 A * | 11/1991 | Davidowski et al. ....... 395/800 |
| 5,108,570 A | 4/1992 | Wang ...................... 204/192.3 |
| 5,236,868 A | 8/1993 | Nulman ...................... 437/190 |
| 5,260,868 A | 11/1993 | Gupta et al. ................ 364/402 |
| 5,293,216 A | 3/1994 | Moslehi ....................... 356/371 |
| 5,367,624 A | 11/1994 | Cooper ....................... 395/157 |
| 5,398,336 A | 3/1995 | Tantry et al. ................ 395/600 |
| 5,408,405 A | 4/1995 | Mozumder et al. ......... 364/151 |
| 5,410,473 A | 4/1995 | Kaneko et al. ........ 364/413.06 |
| 5,444,632 A | 8/1995 | Kline et al. ................. 364/468 |
| 5,497,331 A | 3/1996 | Iriki et al. ................... 364/468 |

(Continued)

FOREIGN PATENT DOCUMENTS

EP          0877308 A      11/1998    ......... G05B 19/418

(Continued)

OTHER PUBLICATIONS

SEMI Draft Doc. 2817, *New Standard: Provisional Specification for CIM Framework Domain Architecture*, published by Semiconductor Equipment and Materials International (SEMI), pp. 1-53, 1998.

(Continued)

*Primary Examiner*—Marc S. Hoff
*Assistant Examiner*—Paul Kim
(74) *Attorney, Agent, or Firm*—Law Office of Albert J. Dalhuisen

(57) ABSTRACT

The present invention provides a semiconductor processing device (800) including a tool (802) having one or more sensors, a primary data communication port (804) and a secondary data communication port (806). A sensor data acquisition subsystem (808) acquires sensor data from the tool via the secondary port (806). The data acquisition subsystem (808) acquires MES operation messages via the primary port (804). Sensor data are communicated to a sensor processing unit (828) of a sensor data processing subsystem (810). The sensor processing unit (828) processes and analyzes the sensor data. Additionally, the processing unit (828) can be adapted for making product or processing related decisions, for example activating an alarm if the process is not operating within control limits. In another embodiment, the present invention provides a method and apparatus for processing data from a wafer fab facility (1000) including a plurality of tools (1004–1010) each having a primary data communication port (1012–1018) and a secondary data communication port (1042–1048).

9 Claims, 11 Drawing Sheets

U.S. PATENT DOCUMENTS

| | | | | |
|---|---|---|---|---|
| 5,586,041 | A | 12/1996 | Mangrulkar | 364/474.16 |
| 5,629,216 | A | 5/1997 | Wijaranakula et al. | 438/502 |
| 5,698,989 | A | 12/1997 | Nulman | 324/719 |
| 5,711,843 | A * | 1/1998 | Jahns | 156/345 |
| 5,715,181 | A | 2/1998 | Horst | 364/554 |
| 5,719,495 | A | 2/1998 | Moslehi | 324/158.1 |
| 5,740,429 | A | 4/1998 | Wang et al. | 395/615 |
| 5,754,297 | A | 5/1998 | Nulman | 356/381 |
| 5,761,064 | A | 6/1998 | La et al. | 364/468.17 |
| 5,783,342 | A | 7/1998 | Yamashita et al. | 430/30 |
| 5,787,000 | A | 7/1998 | Lilly et al. | 364/468.01 |
| 5,808,303 | A | 9/1998 | Schlagheck et al. | 250/330 |
| 5,826,236 | A | 10/1998 | Narimatsu et al. | 705/8 |
| 5,838,566 | A * | 11/1998 | Conboy et al. | 700/115 |
| 5,859,964 | A * | 1/1999 | Wang et al. | 714/48 |
| 5,862,054 | A | 1/1999 | Li | 364/468.28 |
| 5,864,483 | A | 1/1999 | Brichta | 364/468.16 |
| 5,883,437 | A | 3/1999 | Maruyama et al. | 257/773 |
| 5,905,032 | A | 5/1999 | Walton et al. | 435/173.2 |
| 5,910,011 | A | 6/1999 | Cruse | 436/16 |
| 5,914,879 | A | 6/1999 | Wang et al. | 364/468.18 |
| 5,956,251 | A | 9/1999 | Atkinson et al. | 364/468.16 |
| 5,987,398 | A | 11/1999 | Halverson et al. | 702/179 |
| 6,054,379 | A | 4/2000 | Yau et al. | 438/623 |
| 6,128,588 | A | 10/2000 | Chacon | 703/6 |
| 6,138,143 | A | 10/2000 | Gigliotti et al. | 700/203 |
| 6,201,999 | B1 | 3/2001 | Jevtic | 700/100 |
| 6,223,091 | B1 | 4/2001 | Powell | 700/80 |
| 6,226,563 | B1 | 5/2001 | Lim | 700/121 |
| 6,240,331 | B1 * | 5/2001 | Yun | 700/121 |
| 6,249,712 | B1 | 6/2001 | Boiquaye | 700/31 |
| 6,263,255 | B1 * | 7/2001 | Tan et al. | 700/121 |
| 6,269,279 | B1 * | 7/2001 | Todate et al. | 700/121 |
| 6,303,395 | B1 | 10/2001 | Nulman | 438/14 |
| 6,336,055 | B1 | 1/2002 | Cho | 700/121 |
| 6,455,437 | B1 * | 9/2002 | Davidow et al. | 438/710 |
| 6,456,894 | B1 * | 9/2002 | Nulman | 700/121 |
| 6,535,779 | B1 * | 3/2003 | Birang et al. | 700/121 |

FOREIGN PATENT DOCUMENTS

| | | | |
|---|---|---|---|
| JP | HEI 11-67853 | 7/1989 | |
| JP | HEI 1-283934 | 11/1989 | |
| JP | HEI 8-149583 | 6/1996 | H04Q 9/00 |
| JP | HEI 9-34535 | 2/1997 | G05B 23/02 |

OTHER PUBLICATIONS

Peter van Zandt, *Microchip Fabrication*, 3$^{rd}$ ed., McGraw-Hill, pp. 472-478, 1997.

SEMI E10-96, *Standard For Definition And Measurement OF Equipment Reliabiltiy, Availability And Maintainability (RAM)*, published by semiconductor Equipment and Materials (SEMI), pp. 1-23, 1996.

W.R. Runyan et al. *Semiconductor Integrated Circuit Processing Technology*, Addison-Wesley Publ. Com/ Inc. p. 48, 1994.

R. Zorich, *Handbook Of Quality Integrated Circuit Manufacturing*, Academic Press Inc., pp. 464-498, 1991.

Prasad Rampalli et al., "CEPT—A Computer-Aided Manufacturing Application for Managing Equipment Reliability and Availability in the Semi-Conductor Industry", IEE Transactions on Components, Hybrids, and Manufacturing Technology, IEEE Inc. New York, vol. 14, No. 3, pp. 499-506, (1991).

* cited by examiner

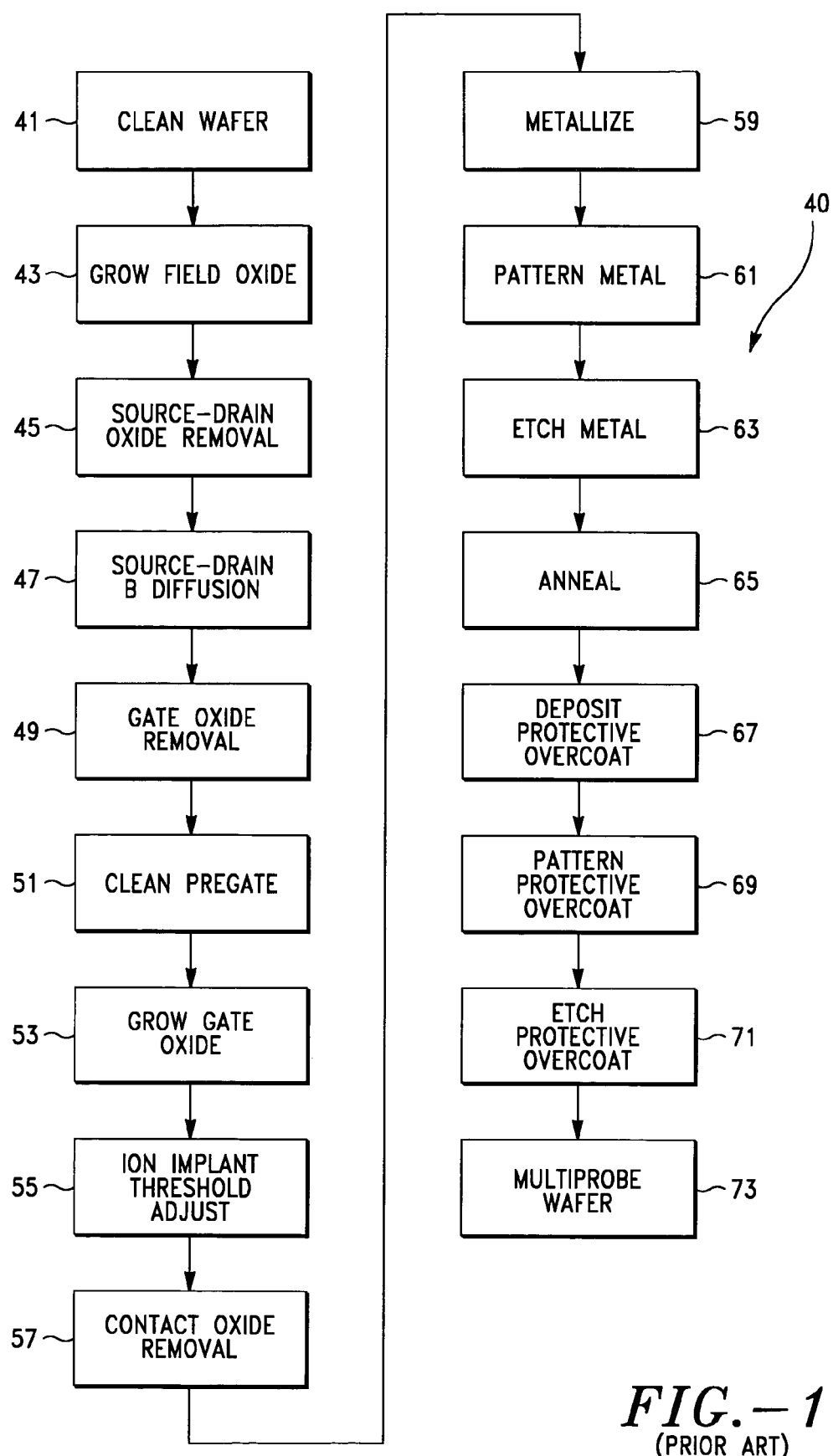
FIG.—1
(PRIOR ART)

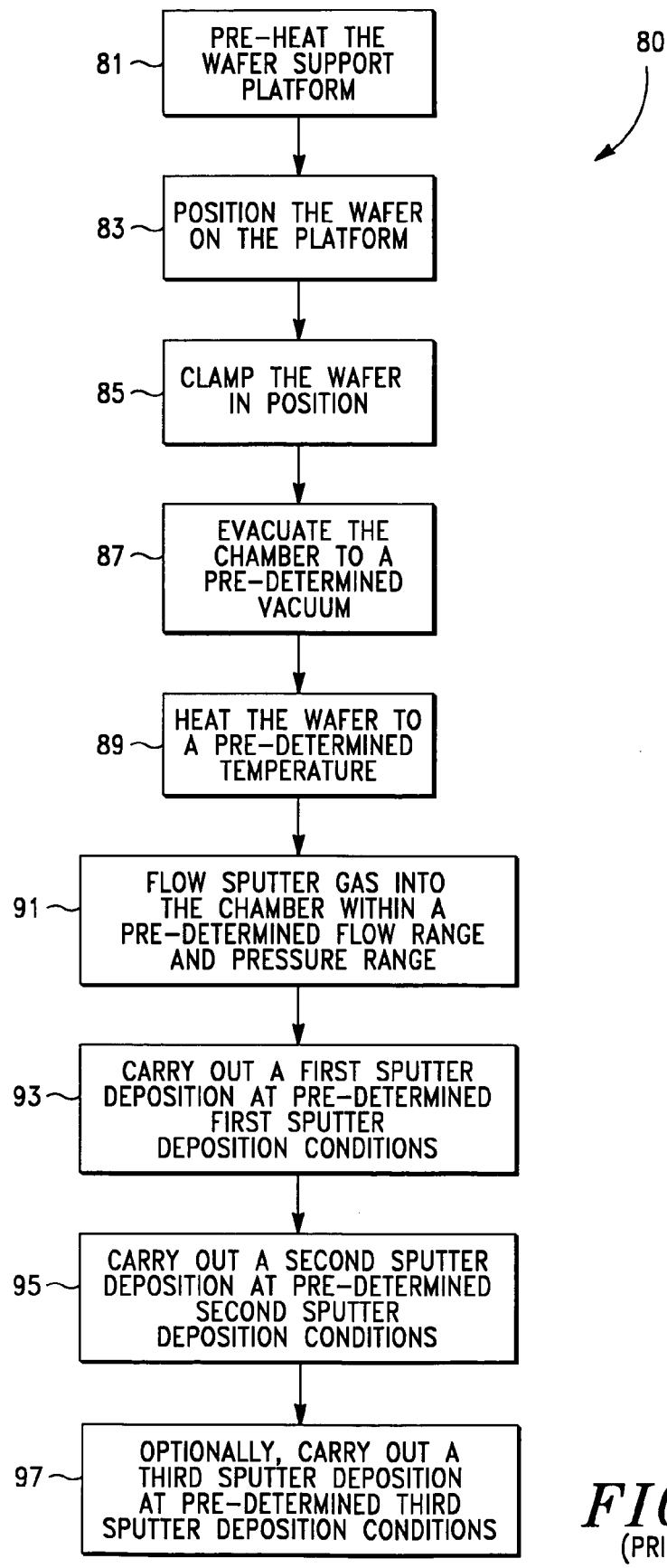
FIG.—2
(PRIOR ART)

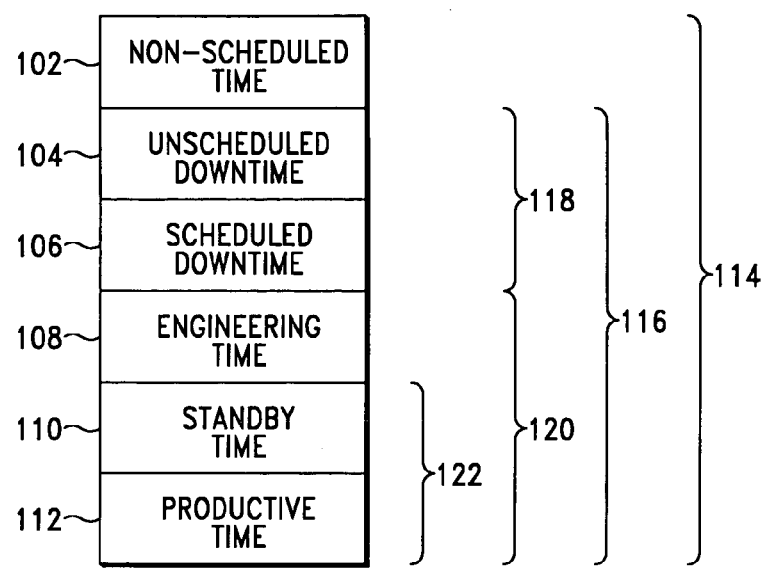
FIG.−3
(PRIOR ART)
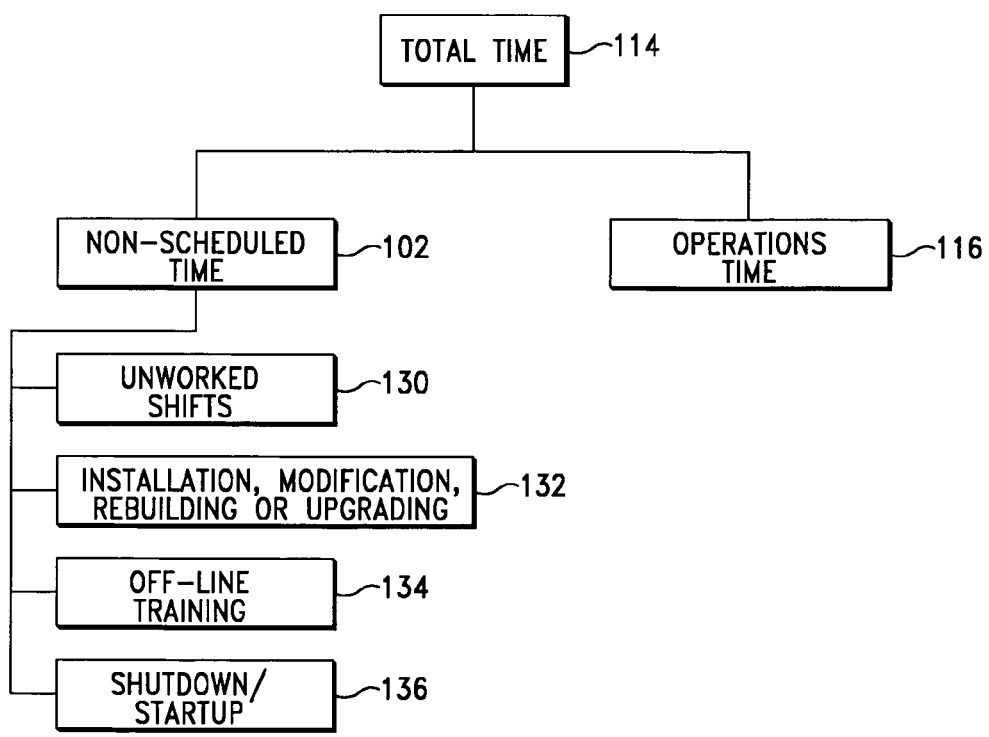
FIG.−4
(PRIOR ART)

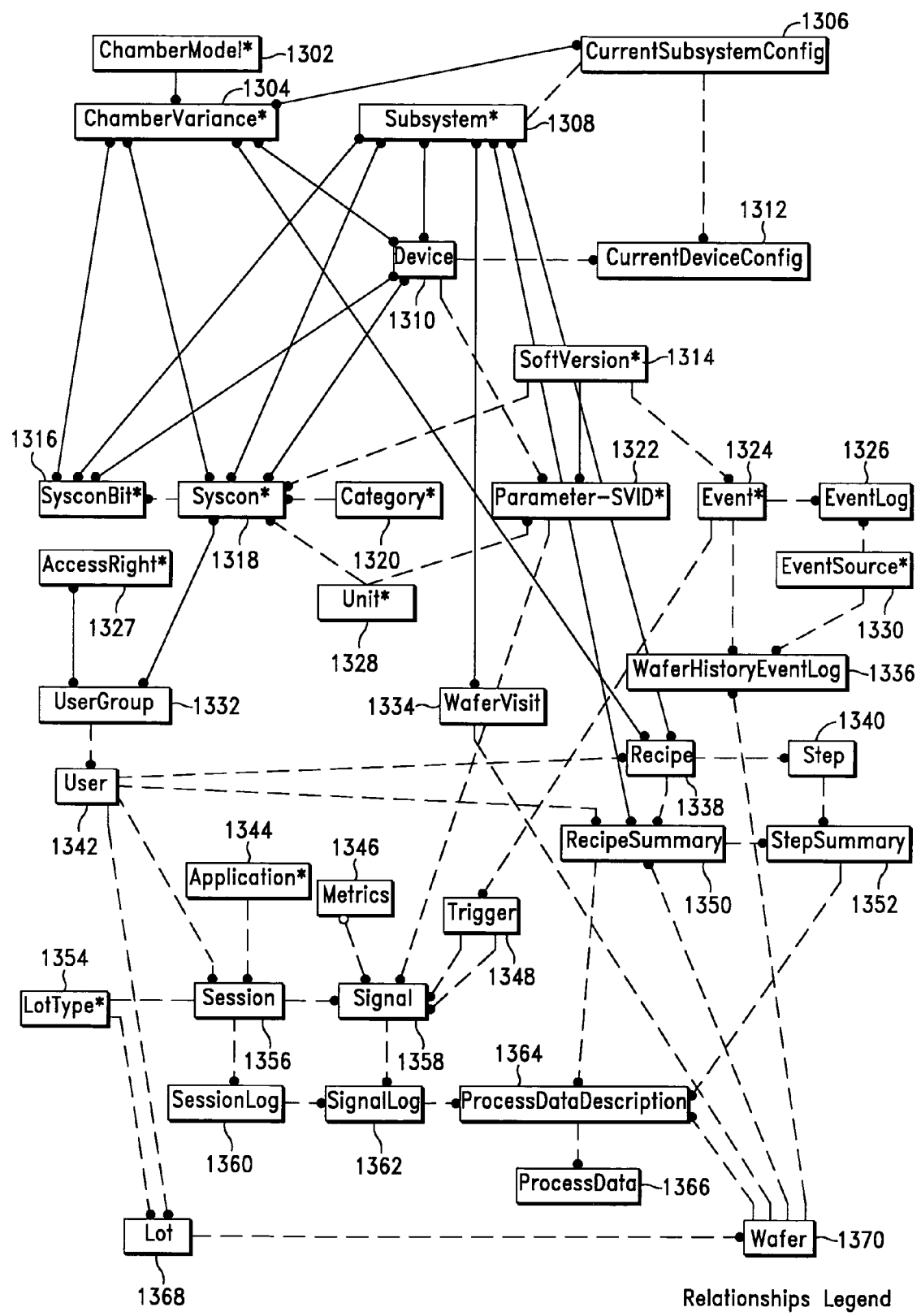
FIG.−13

WAFER FABRICATION DATA ACQUISITION AND MANAGEMENT SYSTEMS

FIELD OF THE INVENTION

The present invention relates to devices, techniques and methods for semiconductor processing.

BACKGROUND OF THE INVENTION

A semiconductor device such as an IC (integrated circuit) generally has electronic circuit elements such as transistors, diodes and resistors fabricated integrally on a single body of semiconductor material. The various circuit elements are connected through conductive connectors to form a complete circuit which can contain millions of individual circuit elements. Integrated circuits are typically fabricated from semiconductor wafers in a process consisting of a sequence of processing steps. This process, usually referred to as wafer fabrication or wafer fab, includes such operations as oxidation, etch mask preparation, etching, material deposition, planarization and cleaning.

A summary of an aluminum gate PMOS (p-channel metal oxide semiconductor transistor) wafer fab process 40 is schematically shown in FIG. 1, illustrating major processing steps 41 through 73, as described in W. R. Runyan et al., *Semiconductor Integrated Circuit Processing Technology*, Addison-Wesley Publ. Comp. Inc., p. 48, 1994. Each of these major processing steps typically include several sub steps. For example, a major processing step such as metallization to provide an aluminum layer by means of sputter deposition in a wafer fab chamber is disclosed in U.S. Pat. No. 5,108,570 (R. C. Wang, 1992). This sputter deposition process is schematically shown in sub steps 81 through 97 of process 80, see FIG. 2.

FIGS. 1 and 2 show sequential wafer fab processes. It is also known to utilize wafer fab sub systems which provide parallel processing steps. Such sub systems typically include one or more cluster tools. A cluster tool as defined herein includes a system of chambers and wafer handling equipment wherein wafers are processed in the cluster tool chambers without leaving a controlled cluster tool environment such as vacuum. An example of a cluster tool is disclosed in U.S. Pat. No. 5,236,868 (J. Nulman, 1993) which employs a vacuum apparatus having a central chamber and four processing chambers. A wafer handling robot in the central chamber has access to the interior of each the processing chambers in order to transfer wafers from the central chamber into each of the chambers while keeping the wafers in a vacuum environment. In one example, wafers in the '868 cluster are first transferred for processing to a cleaning chamber, then to a PVD (physical vapor deposition) chamber, followed by transfer to an annealing chamber and subsequently to a degassing chamber, thus utilizing a sequential process. It is also known to use cluster tools such as those disclosed in the '868 patent to process wafers in chambers which are used in parallel. For example, if a slow processing step is followed by a fast processing step, three chambers can be used in parallel for the slow process while the fourth chamber is used for the fast process.

It is well known to those of ordinary skill in the art that one or more processing parameters of a typical wafer fab process step need to be controlled within a relatively narrow range in order to obtain a product which has the desired characteristics. For example, U.S. Pat. No. 5,754,297 (J. Nulman, 1998) discloses a method and apparatus for monitoring a deposition rate during wafer fab metal film deposition such as sputtering. The '297 patent teaches that the metal deposition rate decreases with increasing age of the sputter target if the input sputter power level is maintained at a constant level. As a consequence, critical processing characteristics, such as the metal deposition rate, may vary from run to run for a given wafer fab processing chamber in ways that can affect the yield and quality of devices processed in that chamber. As disclosed in the '297 patent, the deposition system can be more readily maintained near desired levels when processing variables, such as the power input to the sputtering source, are adjusted in response to observed variations in the metal deposition processing characteristics. This requires in-situ measurement of processing characteristics, using for example a deposition rate monitor based on the optical attenuation of light passing through the deposition environment, thereby detecting the rate at which material is flowing from the deposition source to the deposition substrate, as described more fully in the '297 patent.

Advances in semiconductor materials, processing and test techniques have resulted in reducing the overall size of the IC circuit elements, while increasing their number on a single body. This requires a high degree of product and process control for each processing step and for combinations or sequences of processing steps. It is thus necessary to control impurities and particulate contamination in the processing materials such as process gases. Also, it is necessary to control processing parameters such as temperature, pressure, gas flow rates, processing time intervals and input sputter power, as illustrated in the '570 and '297 patents. As illustrated in FIGS. 1 and 2, a wafer fab includes a complex sequence of processing steps wherein the result of any particular processing step typically is highly dependent on one or more preceding processing steps. For example, if there is an error in the overlay or alignment of etch masks for interconnects in adjacent IC layers, the resulting interconnects are not in their proper design location. This can result in interconnects which are packed too closely, forming electrical short defects between these interconnects. It is also well known that two different processing problems can have a cumulative effect. For example, a misalignment of interconnect etch masks which is not extensive enough to result in an electrical short, can still contribute to causing an electrical short if the process is slightly out of specification for allowing (or not detecting) particulate contamination having a particle size which would not have caused an electrical short if the interconnect masks had been in good alignment.

Processing and/or materials defects such as described above generally cause a reduced wafer fab yield, wherein the yield is defined as the percentage of acceptable wafers that are produced in a particular fab. In-process tests and monitoring of processing parameters are utilized to determine whether a given in-process product or process problem or defect indicates that intervention in the process run is necessary, such as making a processing adjustment or aborting the run. Consequently, product and process control techniques are used extensively throughout a wafer fab. When possible, yield problems are traced back to specific product or processing problems or defects to ultimately improve the yield of the wafer fab. High yields are desirable for minimizing manufacturing costs for each processed wafer and to maximize the utilization of resources such as electrical power, chemicals and water, while minimizing scrap re-work or disposal.

It is known to use SPC (statistical process control) and SQC (statistical quality control) methods to determine suitable wafer fab control limits and to maintain the process within these limits, see for example R. Zorich, *Handbook Of Quality Integrated Circuit Manufacturing*, Academic Press Inc., pp. 464–498, 1991. SPC and SQC methodologies suitable for a wafer fab include the use of control charts, see for example R. Zorich at pp. 475–498. As is well known to those of ordinary skill in the art, a control chart is a graphical display of one or more selected process or product variables, such as chamber pressure, which are sampled over time. The target value of a particular variable and its upper and lower control limits are designated on the chart, using well known statistical sampling and computation methods. The process is deemed out of control when the observed value of the variable, or a statistically derived value such as the average of several observed values, is outside the previously determined control limits. Control limits are typically set at a multiple of the standard deviation of the mean of the target value, such as for example $2\sigma$ or $3\sigma$. The target value is derived from a test run or a production run which meets such wafer fab design criteria as yield, process control and product quality. SPC and SQC are considered synonymous when used in the above context, see R. Zorich at p. 464.

Many components or sub-systems of a wafer fab are automated in order to achieve a high degree of processing reliability and reproducibility and to maximize yields. Wafer fab tools such as chambers are typically controlled by a computer using a set of instructions which are generally known as a recipe for operating the process which is executed by the tool. However, it is recognized that a high degree of automation wherein various processes and metrologies are integrated, is difficult to achieve due to the complexity and inter dependency of many of the wafer fab processes, see for example Peter van Zandt, *Microchip Fabrication*, $3^{rd}$ ed., McGraw-Hill, pp. 472–478, 1997.

It is known to acquire processing data from multiple sensors within a semiconductor processing system and to utilize the acquired data for process monitoring, see for example U.S. Pat. No. 5,910,011 (J. P. Cruse, 1999). As shown in the '011 patent, data regarding multiple process parameters are acquired from the sensors. A statistical engine correlates the relevant process parameters to aid in detecting a specific change in the processing characteristics. The correlated data can be compared to data defining a decision threshold in order to assist in making processing decisions, such as stopping the process when the correlated data show that the processing endpoint has been reached, or providing an alarm signal indicating for example that the process should be stopped. Correlated process parameters data are stored to determine a wafer-to-wafer correlation trend. Overall signal-to-noise ratios are reduced by means of the '011 correlation of two or more signals or parameters, thus improving detection of a decision threshold.

A unit of semiconductor manufacturing equipment, such as a wafer fab tool, commonly employs an on-board computer to identify and/or regulate equipment, processing or material parameters in connection with the tool and the manufacturing process. The communication interface between the on-board computer of the manufacturing unit and a host computer typically includes a protocol such as SECS II (SEMI Equipment Communication Standard). It is well known to those of ordinary skill in the art that conventional communication protocols such as SECS II have limitations including a maximum baud rate of 19200. The limited data transfer capacity of this type of communication protocol imposes a restriction on communications between a computer and a tool, thereby limiting the types of data and the data transfer speed. For example, it is well known to those of ordinary skill in the art that conventional tool communication protocols, such as SECS II are, not suitable protocols for communicating extensive tool metrology data from a tool to a computer, particularly where this concerns extensive collection and use of SPC related data, or SEMI E10-96 data (see below).

It is well known to those of ordinary skill in the art that the functions of semiconductor manufacturing equipment, including for example a wafer fab, can be defined in basic equipment states such as the six states schematically illustrated in FIG. 3, see *SEMI E10-96, Standard For Definition And Measurement Of Equipment Reliability, Availability, And Maintainability* (RAM), published by Semiconductor Equipment and Materials International (SEMI), pp. 1–23, 1996. The semiconductor industry typically uses these six equipment states to measure and express equipment RAM (reliability availability and maintainability), based on functional equipment issues which are independent of who performs the function. These six basic equipment states include non-scheduled time 102 (FIG. 3), unscheduled downtime 104, scheduled downtime 106, engineering time 108, standby time 110 and productive time 112. Non-scheduled time 102 represents the time period wherein the equipment is not scheduled to be used, for example unworked shift. Unscheduled downtime 104 concerns time periods wherein the equipment is not in a condition to perform its intended function, e.g. during equipment repair. Scheduled downtime 106 occurs when the equipment is capable of performing its function but is not available to do this, such as process setup or preventive maintenance. Engineering time 108 concerns the time period wherein the equipment is operated to conduct engineering tests, for example equipment evaluation. Standby time 110 is a time period wherein the equipment is not operated even though it is in a condition to perform its intended function and is capable of performing its function, for example no operator is available or there is no input from the relevant information systems. Productive state 112 represents the time period wherein the equipment is performing its intended function, such as regular production and rework.

Total time period 114, see FIG. 3, is the total time during the period being measured; this includes the six equipment states 102, 104, 106, 108, 110 and 112. Operations time 116 concerns the total time period of states 104, 106, 108, 110 and 112. Operations time 116 includes equipment downtime 118 consisting of states 104 and 106, and equipment uptime 120. Equipment uptime 120 includes engineering time 108 and manufacturing time 122 which consists of standby time 110 and productive time 112.

FIGS. 4 and 5 provide more detailed schematic illustrations of the six equipment states shown in FIG. 3, see SEMI E10-96, at pp. 1–6. As depicted in FIG. 4, total time 114 consists of non-scheduled time 102 and operations time 116. Non-scheduled time 102 includes unworked shifts 130, equipment installation, modification, rebuilding or upgrading 132, off-line training 134 and shutdown or start-up time period 136. Operations time 116, as schematically illustrated in FIG. 5, consists of equipment downtime 118 and equipment uptime 120. Equipment downtime 118 consists of unscheduled downtime 104 and scheduled downtime 106. Unscheduled downtime 104 includes downtime for maintenance delay 140, repair time 142, changing consumables/chemicals 144, out of specification input 146 or facilities related downtime 148. Scheduled downtime 106 concerns downtime for maintenance delay 150, production test 152, preventive maintenance 154, changing consumables/chemicals 156, setup 158 or facilities related 159.

Equipment uptime 120, depicted in FIG. 5, consists of engineering time 108 and manufacturing time 122. Engineering time 108 includes process experiments 160 and equipment experiments 162. Manufacturing time 110 consists of standby time 110 and productive time 112. Standby time 110 includes time during which there is no operator 180, no product 182, no support tool 184 or when an associated cluster module is down 186. Productive time 112 concerns a time period during which there is regular production 190, work for a third party 192, rework 194 or an engineering run 196. The various equipment states as described in connection with FIGS. 3–5 provide a basis for communicating and evaluating RAM related equipment information in the semiconductor industry. RAM related equipment information includes topics which are well known to those of ordinary skill in the art such as: equipment reliability, equipment availability, equipment maintainability and equipment utilization, see for example SEMI E10-96 at pp. 6–11.

Accordingly, a need exists for methods and techniques which provide improved data transfer capacity between a tool and a host computer, as well as improved process control, quality, yield and cost reduction. Also, there is a need to integrate wafer fab equipment time states with improved maintenance and process scheduling.

SUMMARY OF THE INVENTION

The present novel techniques for data acquisition and management systems of semiconductor processing devices and wafer fabs provide the needed improvement in data acquisition, process control, quality, yield and cost reduction.

In one embodiment of the present invention, a semiconductor fabricating tool and processing methods are provided wherein the tool includes a primary communication port and a secondary communication port. The tool also includes a sensor for sensing process, product and equipment parameters that are then communicated to a sensor data acquisition unit via the secondary port. The primary port is employed to communicate MES messages and queries to the tool.

In another embodiment a method and apparatus are provided for processing data from a wafer fab facility including a plurality of tools each having a primary and a secondary communication port as well as a sensor communicating with the secondary communication port. The facility additionally includes a host database and host computer as well as a data base management system and wafer fab management software. Tool operating instructions are executed employing legacy software communicating via the primary port of each tool. Sensor data are acquired via the secondary port of each tool.

In yet another embodiment of the present invention, a computer executable process for operating a wafer fab management system is provided. The system derives a model for the system by defining wafer fabrication data structures, and by defining relationships between these structures. System configuration data are selected for operating the system. The configuration data are then adjusted according to a user input. Operational data are subsequently gathered when the system is activated. The operational data are gathered and then formatted to form updated data structures. A database management system is utilized to manage the gathered data and to insure consistency with the system data structures and the relationships between the data structures.

In still another embodiment of the present invention a network distributed database for semiconductor fabricating is provided utilizing a plurality of semiconductor processing devices each having a tool including a primary and secondary data communication port. A network is provided for interconnecting the plurality of semiconductor devices and a data base management system.

In another embodiment of the present invention a computer executable data structure is provided for operating one or more tools of a wafer fab. The data structure includes control system data.

In yet another embodiment of the present invention a data structure is provided wherein data, organized in relational tables, are adapted for being accessed by one or more applications for semiconductor fabricating. For example, a recipe manager application can access a recipe manager relational table or a recipe step relational table to add information to these tables, or to change the content of these tables.

BRIEF DESCRIPTION OF THE DRAWINGS

FIG. 1 is a flowchart schematically illustrating a prior art wafer fab process.

FIG. 2 is a flowchart schematically illustrating a prior art wafer fab sputter metallization process.

FIG. 3 is a stack chart schematically illustrating prior art equipment time states.

FIG. 4 is a block diagram schematically showing prior art equipment time states of the stack chart illustrated in FIG. 3.

FIG. 13 is a functional database schema diagram illustrating relationships between elements of a database of the present invention.

DETAILED DESCRIPTION OF THE INVENTION

While describing the invention and its embodiments, certain terminology will be utilized for the sake of clarity. It is intended that such terminology includes the recited embodiments as well as all equivalents.

Figure 6:
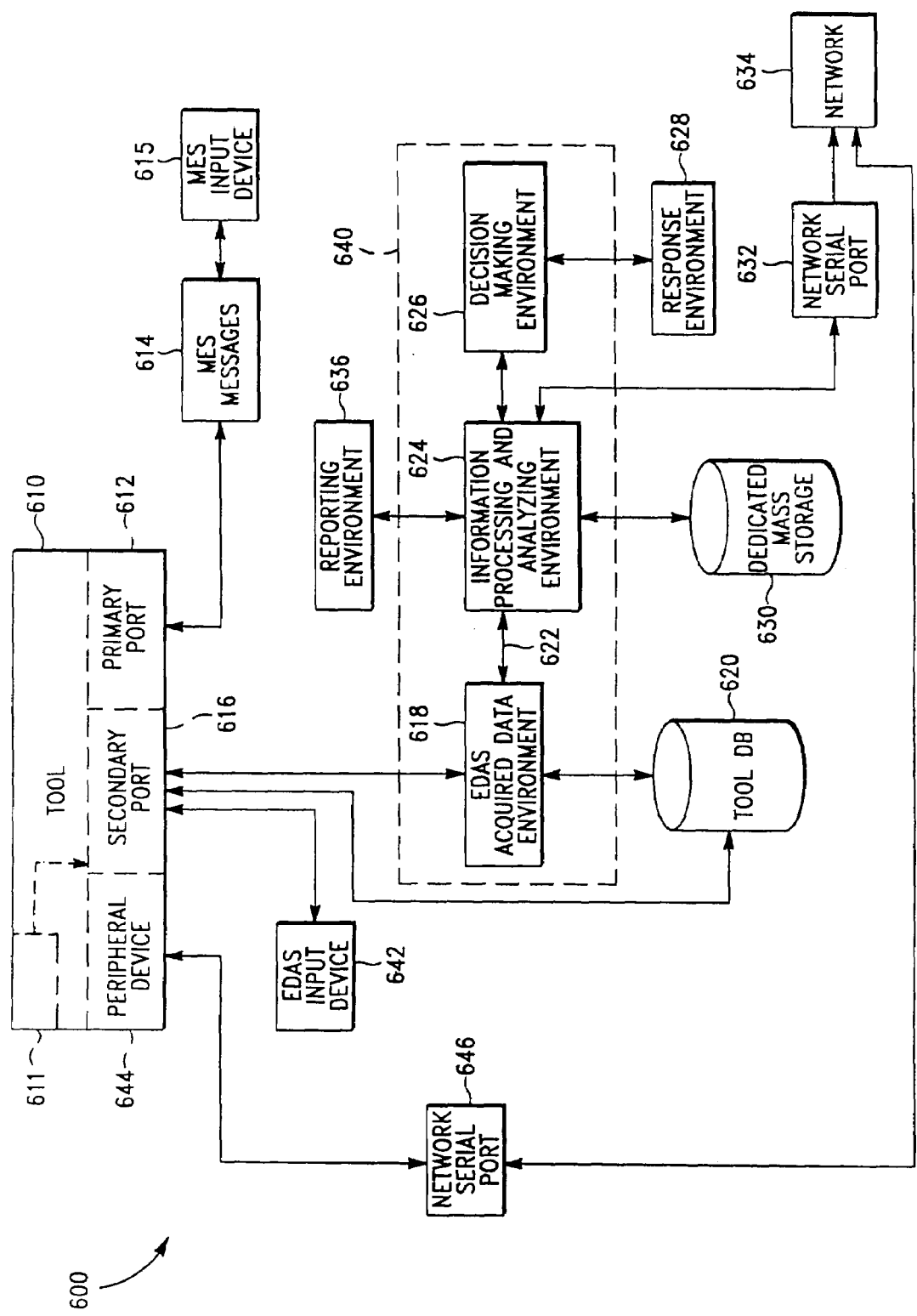
FIG. 6 is a block diagram schematically illustrating a semiconductor processing device of the present invention.

One embodiment of the invention, schematically illustrated in FIG. 6, shows a semiconductor processing device

600, employing an EDAS (enhanced data acquisition system) of the present invention. The novel EDAS is adapted for monitoring, i.e. observing, analyzing and reporting, semiconductor wafer or IC (integrated circuit) fabricating or processing tools, hereinafter referred to as tools. These tools include wafer fab chambers such as etch and deposition chambers, as well as wafer and wafer cassette handling equipment. The novel EDAS includes: (1) a DB (database) for storing information concerning equipment, processes and wafer data, (2) software adapted for performing data acquisition or collection, SPC analysis and historical reporting, and (3) a UI (user interface) for obtaining information about individual tools and factory wide equipment.

Software for controlling and executing the EDAS of the present invention provides: (1) data collection and storage of equipment data, (2) process and equipment monitoring, including real time and correlation with historical data, particularly where these data are correlated with the relevant wafer lot history file, and (3) control limits detection of single processing events including alarmed responses.

Tools adapted for employing EDAS include two communication ports. A primary communication port provides an interface for communicating conventional MES (manufacturing execution systems) messages and data. The primary port utilizes a conventional equipment standard, such as SECS II (SEMI Equipment Communication Standard II). Typically, the primary port includes a serial port operating at a maximum baud rate of about 19200. A SECS II primary port provides an interface protocol that supports conventional, also known as standard, SECS II messages using any of the technologies that are well known to those of ordinary skill in the art. A novel secondary port provides an interface for communicating EDAS data through an interface protocol that supports conventional SECS II messages as well as custom SECS II messages adapted for communicating EDAS data. Typically, the secondary port operates at a higher baud rate than the primary port. Preferably, the secondary port includes a serial port operating at a maximum baud rate of about 38400. The novel secondary port supports messages using the HSMS (high speed message service) protocol. The primary and secondary ports are adapted for communicating computer executable messages to the tool.

Returning to FIG. 6, device 600 includes a tool 610, a primary communication port 612 for communicating conventional MES messages and data 614, a novel secondary communications port 616 providing an interface between tool 610 and a novel EDAS acquired data environment 618. An information processing and analyzing environment 624 is linked through a link 622 to the EDAS acquired data environment 618. The device also includes a tool DB 620. Optionally, device 600 can be equipped with a decision making environment 626 which is optionally adapted for communication with a response environment 628. Additionally, a dedicated mass storage 630 is linked to information processing and analyzing environment 624. Optionally, network access is provided through one or more network serial ports 632 communicating with a network 634. The expression "environment" as defined herein, includes an aggregate of technologies, methods and/or devices which provide a resource for acquiring data, data structures or information and which, optionally, can interact with the acquired data, data structures or information. An environment as used herein, includes a computer environment. The expression "computer environment" as defined herein, includes computer software and/or hardware which provides a resource for acquiring data, data structures or information and which can interact with the acquired data, data structures or information.

Tool 610, as depicted in FIG. 6, includes such controllers (not shown) and inputs as are necessary to produce the desired wafer or IC structures, for example microprocessors including on-board computers, computer operated software as well as mechanical/electrical controllers including switches and electrical circuits employing for example a variable resistor such as a potentiometer. These controllers operate or control various tool processes and operational functions such as gas flow and wafer handling. One or more sensors 611 schematically depicted in FIG. 6, are provided in connection with tool 610 to sense and report process, product or equipment parameter data. Operational instructions, such as MES instructions and queries, for tool 610 can be provided to tool 610 by means of tool DB 620 or by means of MES messages 614 utilizing for example an MES input device such as a keyboard or a GUI (graphics user interface) 615, a pointing device such as a light pen or a mouse, an OCR (optical character reader), voice instructions employing for example voice recognition software, and a removable data storage medium or device, using any of the methods and technologies that are well known to those of ordinary skill in the art. Typically, operational instructions can also be provided to the tool by accessing the tool on-board processor or by conventional data entry techniques. Operational instructions may include specific settings for equipment parameters, for example the closing or opening of a valve. These instructions can also include processing instructions, for example specifying a processing recipe or specifying wafer lot numbers or specifying the beginning or ending of a processing sequence.

Input messages, queries or data for novel EDAS can be provided to tool 610 by means of an input device 642 and/or tool DB 620, via secondary port 616. Suitable examples of input device 642 include a keyboard, a GUI, a pointing device such as a light pen or a mouse, an OCR, voice instructions, and a removable data storage medium or device such as a removable digital or optical data computer disk or tape. An EDAS of the present invention typically employs two input devices 615 and 642. It will be understood that these two devices can be merged (not shown) into one device having the separate functionalities of device 615 for MES input and device 642 for EDAS input of messages and queries. Tool 610 sensors 611 can provide EDAS data including sensor data, which are communicated through secondary port 616, see FIG. 6, and are acquired in EDAS acquired data environment 618 of device 600. This environment includes mass storage devices and/or communication links for receiving and then communicating the data to information processing and analyzing environment 624. Dedicated mass storage device 630 provides a storage medium for historical data, including wafer lot history files, and process or product control limits. A reporting environment 636 is adapted for providing reports in for example hard copy or by means of a display on a monitor. These reports include alphanumeric data and graphical representations. Links such as link 622 include hard wire connections, conductive surfaces, optical components and conventional wireless communication techniques.

Information processing and analyzing environment 624 of novel semiconductor processing device 600, shown in FIG. 6, utilizes methodologies such as are well known to those of ordinary skill in the art, to determine process control limits meeting the design and yield criteria for producing semiconductor wafers and IC structures. The control limits are statistically derived using one or more processing and/or in-process product parameters which are indicative of a process meeting the design and yield criteria for fabricating the structure. Once the control limits are established, environment 624 acquires process and/or product metrology information from production runs for producing these structures, using the same parameters as were used to establish the control limits. An analysis is then performed in this environment to determine whether the process or product is produced within the control limits. Environment 624 typically employs a data processor, such as a microprocessor to perform the data processing requirements of this environment.

SPC methodologies suitable for use in information processing and analyzing environment 624 of the present invention include control chart methodologies and Pareto charts. A Pareto chart is a bar chart representation that displays a ranking of the number of occurrences of a particular defect as compared with the cumulative number of occurrences of all defects and the number of occurrences of each of the other defects or problems. As is well known to those of ordinary skill in the art, control limits are typically determined following the collection of a statistically significant number of data, which are relevant to an important or critical parameter indicative of the process operating as designed and resulting in an acceptable yield. A suitable parameter for a process carried out in tool 610 can include sputter power in a sputter deposition process, gas flow rate and/or pressure, and particle contamination in the chamber environment. Metrology data measuring these parameters at specific intervals provide the input for the determination of control limits. Additionally, metrology data concerning in-situ product testing can be used in a similar way. For example using the technology disclosed in the '989 patent for measuring the sheet resistance of an electrically conductive film on a semiconductor substrate in-situ, while maintaining the substrate within the vacuum environment of the semiconductor process apparatus. The data which are obtained from the process while running in control, i.e. within operational specification and/or yield, are then computed to determine the process control limits using statistical methods which are well known to those of ordinary skill in the art. Subsequent production runs are then analyzed using metrology data of the same processing or in-situ product parameters as were used to determine the control limits.

Information processing and analyzing environment 624 of novel semiconductor processing device 600 (FIG. 6) is adapted for comparing real time data with historical data or for performing chamber matching analysis, utilizing SPC methodologies and providing numerical and/or graphical representations through for example reporting environment 636.

The results of the analysis performed in environment 624 are acquired by decision making environment 626, as is schematically illustrated in FIG. 6. When decision making environment 626 determines that the process is operating within the predetermined control limits, there is no intervention. However, when analysis shows that the process is outside the control limits, a response such as an alarm or an out of control limits indicator can be activated, responsive to a predetermined alarm condition e.g. being outside the control limits. It is also contemplated to initiate processing intervention through response environment 628, for example by aborting the processing sequence if the process is not operating within the control limits. Decision making environment 626 typically employs a microprocessor.

It will be understood that environments 618, 620 and 624 can be provided by a host computer 640 (FIG. 6). It will also be understood that novel semiconductor processing device 600 includes a novel product or a novel apparatus comprising one or more digitally coded equipment, processing or product data structures including the novel EDAS.

Tool 610 can be equipped with one or more peripheral devices 644, such as pumps or chillers. The peripheral devices can transmit data to network 634 via a network port 646.

Figure 7:
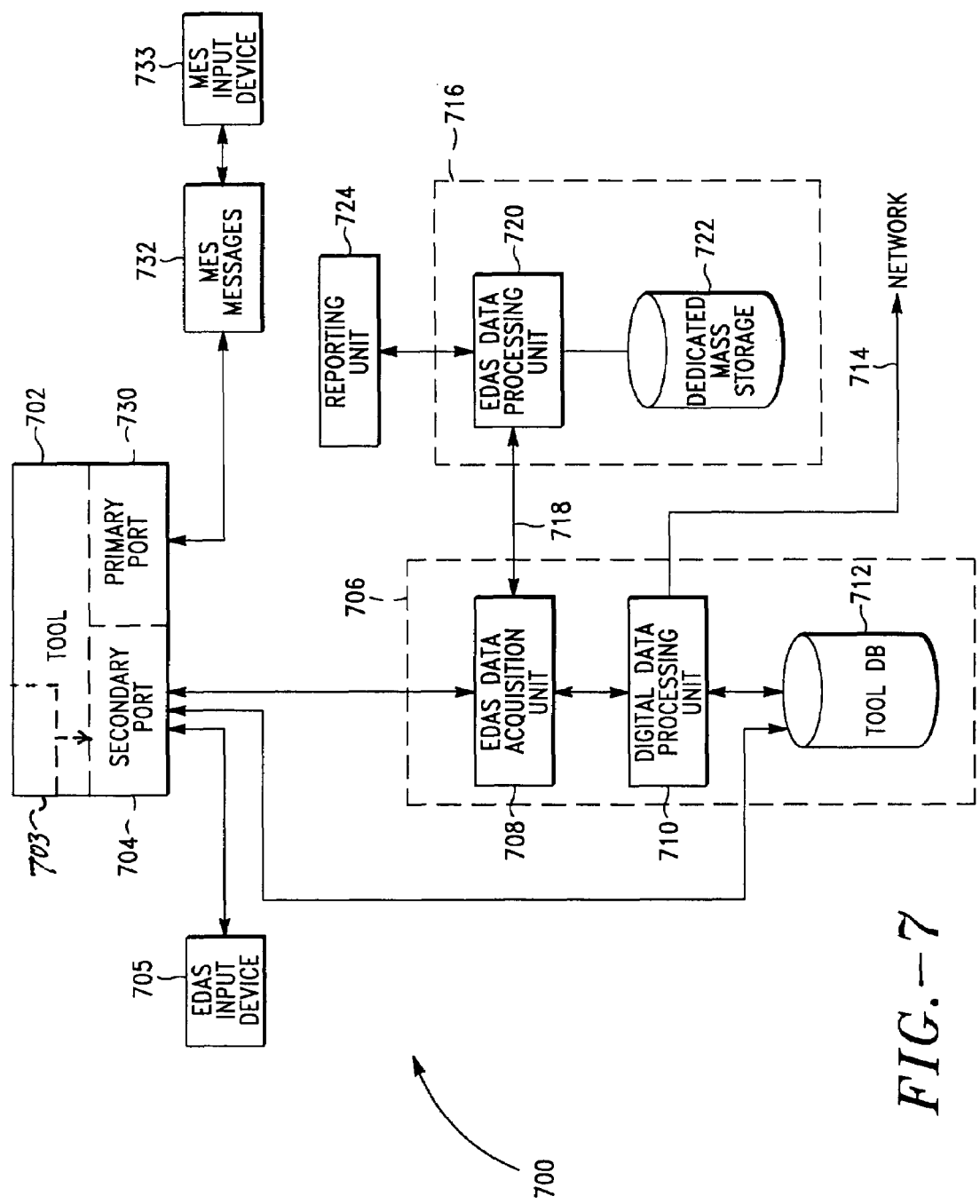
FIG. 7 is a block diagram schematically illustrating another semiconductor processing device of the present invention.

Another embodiment of the present invention, schematically illustrated in FIG. 7, shows a semiconductor processing device 700 of the present invention. This device includes a tool 702 having one or more sensors 703 schematically depicted in FIG. 7 providing EDAS sensor data that are communicated through a novel secondary port 704, to a data acquisition subsystem 706 including an EDAS data acquisition unit 708, an optional digital data processing unit 710, a tool DB 712 and a network connection 714. Secondary port 704, EDAS data acquisition unit 708 and tool DB 712 of device 700 are similar to secondary port 616, EDAS acquired data environment 618 and tool DB 620 respectively of device 600 as described in connection with FIG. 6. Returning to FIG. 7, EDAS information, messages or queries can be communicated from EDAS input device 705 or tool DB 712 to tool 702 via secondary port 704, while input device 733 can be utilized to communicate MES messages to tool 702 via primary port 730. Input devices 705 and 733, MES messages 732 and primary port 730 are similar to the corresponding units described in connection with device 600. Digital data processing unit 710, for example employing a CPU, can be employed to convert or process the data to a format suitable for processing by a data processing subsystem 716 or for transmission to a network.

Data acquisition subsystem 706 of device 700 depicted in FIG. 7, communicates via a link 718 with data processing subsystem 716 including an EDAS data processing unit 720 and a dedicated mass storage device 722. Acquired EDAS data are communicated from EDAS data acquisition unit 708 to EDAS data processing unit 720. The EDAS data are processed and analyzed in unit 720 resulting in processed EDAS data, using methods such as those described in connection with the information processing and analyzing environment 624 of device 600, shown in FIG. 6. Additionally, unit 720 is adapted for making product or processing related decisions to, for example, activate an alarm if the process is not operating within control limits, as described in connection with decision making environment 626 and response environment 628 of device 600. Mass data storage device 722 of sensor data processing unit 720 can provide for example historical data, including wafer lot history files, or process control limit data. Reporting unit 724 is adapted to, for example, display or print the results obtained from processing and analyzing the EDAS data, similar to reporting environment 636 of device 600, shown in FIG. 6.

In a specific embodiment, novel semiconductor processing device 700 is utilized to determine the endpoint of a wafer etching process. Upon reaching the etch process endpoint, the etch step is completed and must be terminated. See for example U.S. Pat. No. 5,910,011 (Cruse) for a description of this process. In order to make an endpoint determination the output of one or more sensors must be monitored to make this determination. Generally, this task requires the use of a mass storage device to support processing the sensor data. Data acquisition subsystem 706 of device 700 is implemented on a Microsoft NT type operating system using a PC processor operating at a 400 MHz clock rate. The PC processor includes three X GB hard disks for storage of program and data. Thus, in this specific embodiment, the digital data processing unit 710 and the mass storage device 712 are both supplied by the PC processor and its hard disks. The network connection 714 is provided by an Ethernet card and compatible software installed at the PC. Data processing unit 710 and a portion of tool DB 712 include a stored program that runs on data processing unit 710 and configures unit 710 to process and format the sensor data acquired in EDAS data acquisition unit 708, and to then store sensor data on tool DB 712.

In the present embodiment for the endpoint determination of a wafer etching process in an etching chamber the configuring software is stored on one of the hard disks, running on the PC, and organizing the PC to receive EDAS data from tool 702 via secondary port 704 in EDAS data acquisition unit 708. The configuring software also processes and formats the data and stores predetermined data on one of more of the hard disks. Optionally, the predetermined data can be communicated via network connection 714. The combination of tool 702 and data acquisition subsystem 706 communicating with tool 704 via secondary port 704, defines a sensor instrumented tool employing EDAS. Data processing subsystem 716 comprises an endpoint processing subsystem 716 that receives EDAS acquired data via data link 718. Data processing unit 720 comprises a dedicated endpoint data processor that is running an endpoint determination application. The dedicated processor 720 is supported by a mass storage device 722, for example an 8 GB hard disk. Communication between endpoint processor 720 and data acquisition subsystem 706 is provided via data link 718. Thus, endpoint processing subsystem 716 determines when the endpoint has occurred, and that conclusion is then communicated to data acquisition subsystem 706 via link 718. Optionally, device 700 can also be utilized to initiate an alarm or alert an equipment operator to indicate that the endpoint has been reached.

Figure 8:
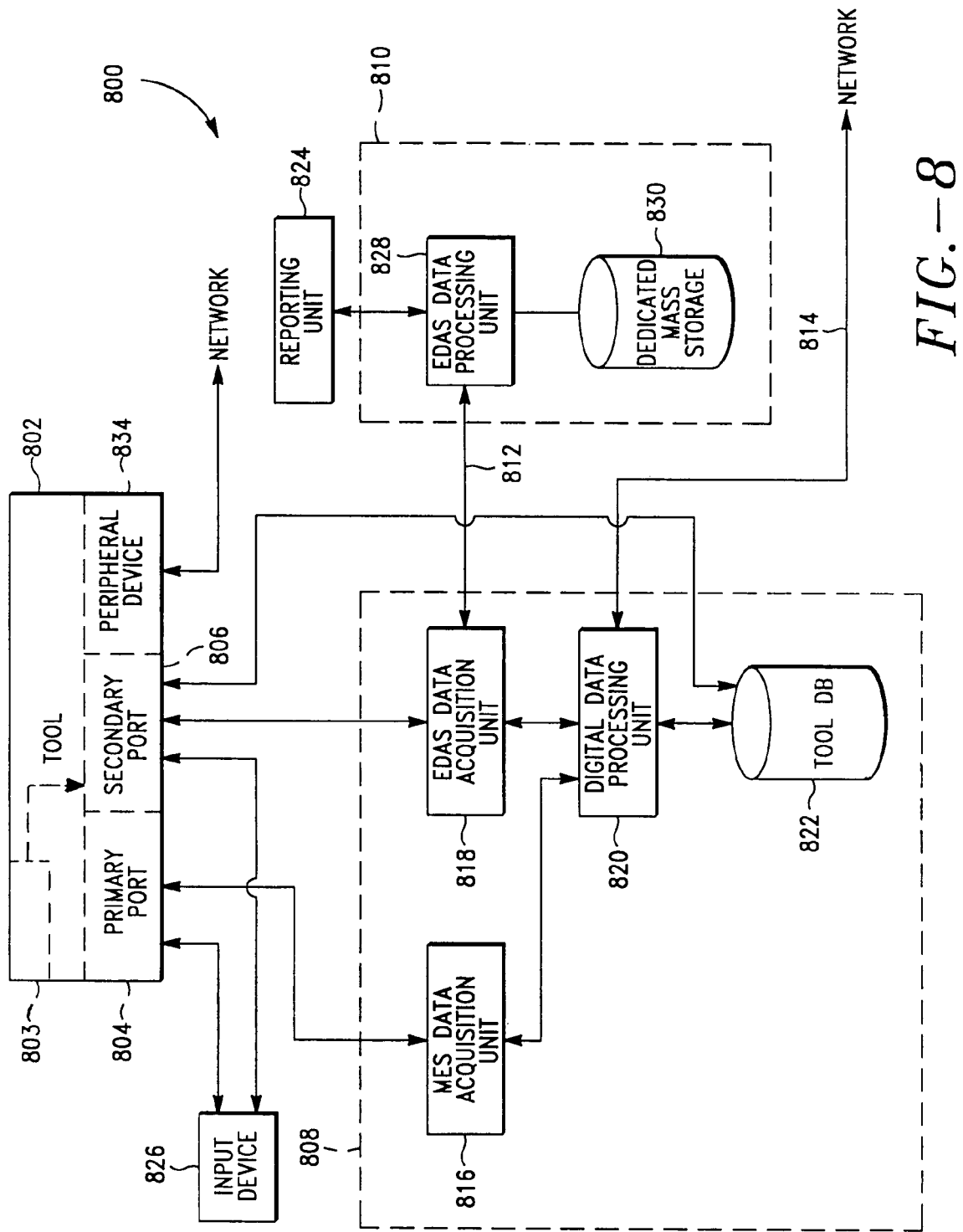
FIG. 8 is a block diagram schematically illustrating an additional semiconductor processing device of the present invention.

An additional embodiment of the present invention wherein some of the MES and the novel EDAS functions are combined, as schematically illustrated in FIG. 8, depicting a semiconductor processing device 800. Device 800 includes a tool 802 having one or more sensors 803 schematically depicted in FIG. 8. The device also includes a primary port 804, a secondary port 806, a data acquisition subsystem 808, a sensor data processing subsystem 810, a data link 812 and a network connection 814, wherein the primary and secondary ports are similar to the corresponding ports of devices 600 and 700. The data acquisition subsystem 808 includes an MES data acquisition unit 816 for acquiring data for example concerning the on-line status of tool 802, and an EDAS data acquisition unit 818, for example acquiring tool sensor EDAS data for SPC analysis. A digital data processing unit 820 and a tool database 822 are also included in data acquisition subsystem 808. Digital data processing unit 820 is adapted for processing data from MES acquisition unit 816 and from EDAS data acquisition unit 818. EDAS data acquisition unit 818 and tool DB 822 of device 800 are similar to EDAS data acquisition unit 708 and tool DB 712 respective of device 700.

Input device 826 of processing device 800 shown in FIG. 8 is adapted for entry of MES inputs and for entry of EDAS inputs, thereby providing a combination of the functions of MES input device 733 and EDAS input device 705 of processing device 700 illustrated in FIG. 7. A sensor data processing subsystem 810, communicating with subsystem 808 via link 812, includes a dedicated EDAS data processing unit 828 and a dedicated mass storage device 830, similar to EDAS data processing unit 720 and dedicated mass storage 722 of device 700 shown in FIG. 7. The MES data from MES data acquisition unit 816 can be processed by data processing unit 820. The software application that runs on the data processing unit 820 includes a module for handling the MES data, and for making the MES data a part of tool DB 822.

Device 800 (FIG. 8) includes a reporting unit 824 driven by sensor data processing subsystem 810. Reporting unit 824 of device 800 is similar to reporting environment 636 of device 600, illustrated in FIG. 6, except that reporting unit 824 is additionally adapted for reporting MES related data. The reporting unit, data entry device, and compatible software running on data processing unit 820, permits the tool operator to control the configuration and the operation of tool 802 and data acquisition subsystem 808 using familiar interface devices. Semiconductor processing device 800 also includes a peripheral device 834, such as a pump or a chiller. Peripheral device 834 of tool 802 can receive instructions or provide operation data via a network.

Figure 9:
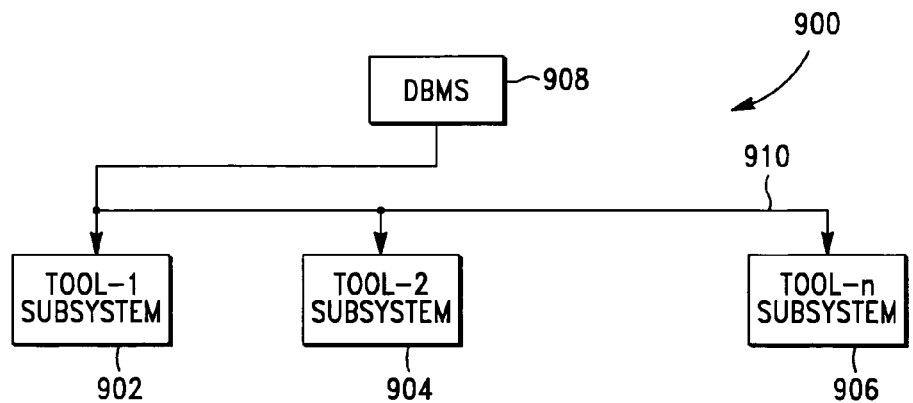
FIG. 9 is a block diagram schematically illustrating a network of instrumented tool subsystems and a database management system of the present invention.

A further embodiment of the present invention provides a network system 900 of semiconductor processing devices. Network system 900, schematically illustrated in FIG. 9, includes a plurality of semiconductor processing devices exemplified by devices 902, 904 and 906, a DBMS (database management system) 908, and a network 910 interconnecting the separate semiconductor manufacturing devices and the DBMS. The resulting system forms a network distributed database that includes all the data in all the digital storage devices. In a specific embodiment of system 900, DBMS 908 is configured as a network server and the individual semiconductor processing devices 902, 904, and 906 are configures as network clients. Semiconductor processing devices suitable for use in the present invention include semiconductor processing devices 600, 700 and 800, illustrated in FIGS. 6, 7 and 8 respectively.

Figure 10:
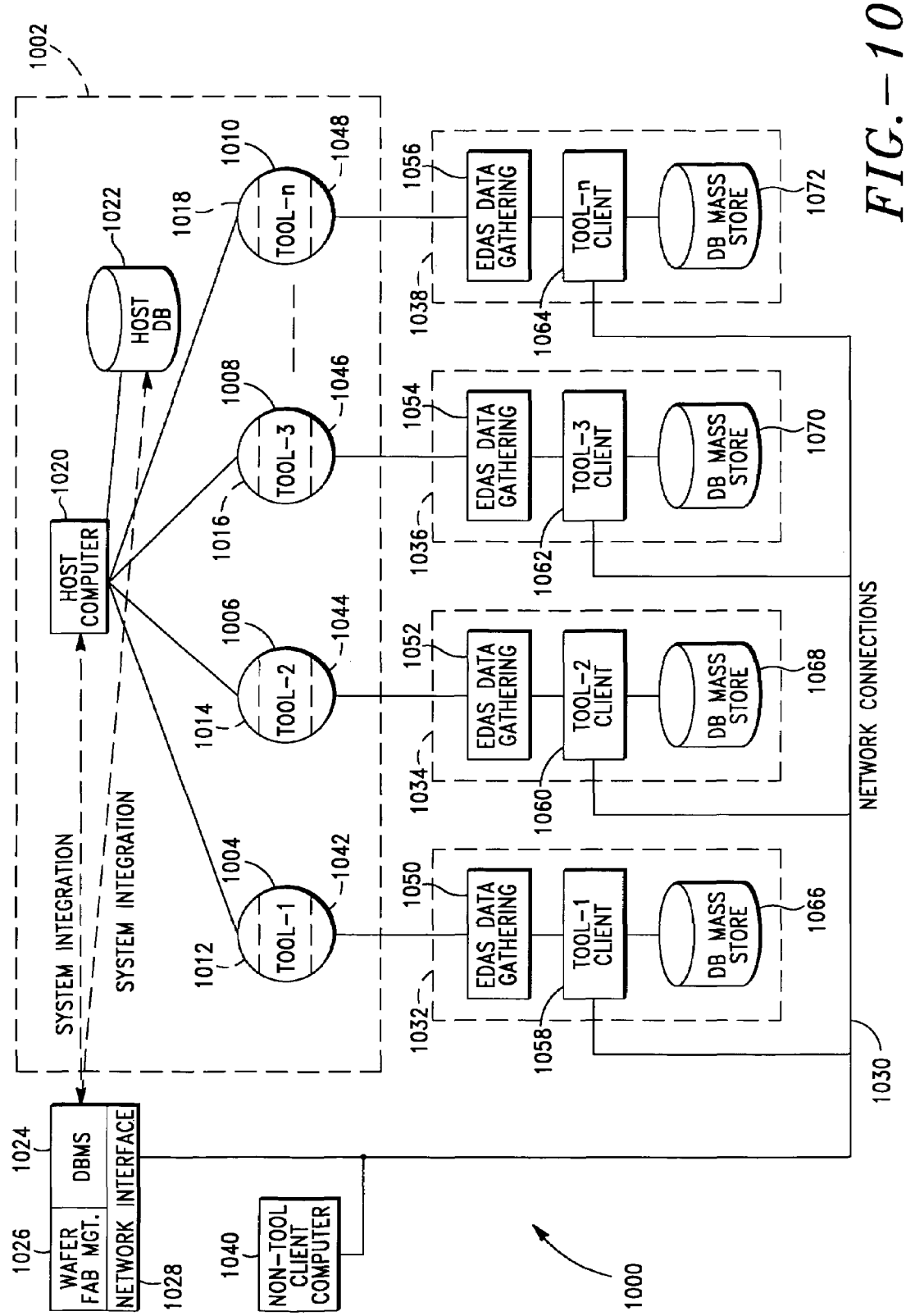
FIG. 10 is a block diagram schematically showing a networked, distributed database management system for managing a wafer fab management system of the present invention.

Another embodiment of the present invention, illustrated in FIG. 10, shows a system 1000 for managing a wafer fabrication facility. System 1000 includes a wafer fab component 1002 having a tool-1 1004, a tool-2 1006, a tool-3 1008 and a tool-n 1010, the tools having primary ports 1012, 1014, 1016 and 1018 respectively, secondary ports 1042, 1044, 1046 and 1048 respectively, a host computer 1020, and a host database 1022. Host computer 1020, host database 1022 and primary ports 1012–1018 form a legacy system within wafer fab component 1002. The primary and secondary ports of system 1000 are similar to the corresponding ports of device 600 illustrated in FIG. 6. Returning to FIG. 10, each of tools 1 through 2 includes one or more sensors (not shown) for providing EDAS data. System 1000 also includes a database management system 1024, wafer fab management software 1026, a network interface 1028, a network 1030, EDAS tool subsystems 1032, 1034, 1036 and 1038, and a non-tool client computer 1040. Each EDAS tool subsystem receives tool sensor EDAS data via its secondary port. As shown in FIG. 10 each EDAS tool subsystem includes an EDAS data gathering front end 1050, 1052, 1054 and 1056, a tool client 1058, 1060, 1062 and 1064 and a mass storage device 1066, 1068, 1070 and 1072 each providing a DB for each of the tools. Tool clients 1058–1064 for tool 1, 2, 3 and n respectively provide a functionality similar to the functionality of optional data processing unit 710 and EDAS data processing subsystem 716 of device 700 shown in FIG. 7. With reference to FIG. 10 a reporting unit (not shown) similar to reporting unit 724 of device 700 can be provided to each of EDAS tool subsystems 1032–1038. Additionally, a similar reporting unit (not shown) can be provided to non-tool client computer 1040. An input device for entering EDAS messages and queries, similar to EDAS input device 705 of processing device 700 (FIG. 7), can be provided to each of EDAS tool subsystems 1032–1038 and to non-client computer 1040. EDAS messages and queries can also be entered into tools 1, 2, 3 and n by means of DB parts 1, 2, 3 and n, similar to the input system of device 700 and wherein tool DB 712 is adapted for entering EDAS messages.

The present invention provides functionality and database management that is added to the legacy system of wafer fab component 1002, shown in FIG. 10, through database management system 1024 and wafer fab management software 1026 that are integrated with host computer 1020 and host DB 1022 to form a compatible system utilizing the primary ports 1012–1018 for managing wafer fab component 1002 by means of operating instructions, such as MES instructions, provided through host computer 1020. Duplicate values of MES instructions are synchronized between host (legacy) database 1022 and the added database management features 1024. In a specific embodiment, host computer 1020 is a work station having one or more mass storage devices such as host DB 1022. In this specific embodiment, database management 1024, wafer fab management software 1026, and network interface 1028 features reside within work station 1020, while the database and data structures reside partly on host DB 1022 and partly on mass storage devices 1066–1072 of tool subsystems 1032–1038 As described above, databases of system 1000 are synchronized to transfer copies of the duplicated information from wafer fab 1002 to database 1024. The present invention includes EDAS data, including sensor data, acquisition via secondary ports 1042, 1044, 1046 and 1048, and EDAS tool subsystems 1032,1034,1036 and 1038, respectively. The EDAS data acquisition of the present invention is employed to gather information not available through primary ports 1004, 1006, 1008 and 1010 of wafer fab component 1002.

In another specific embodiment of the present invention, management system 1000 (FIG. 10) described above implements a host computer 1020 and network interface 1028 as a network server, and implements each EDAS tool subsystem 1032–1038 as a network client. In other specific embodiments, wafer fab management system 1000 includes one or more non-tool client computers 1040 that are used to extend a user interface throughout the networked system, wherein the non-tool client computer provides remote access to wafer fab component 1002, host computer 1020, host database 1022 and EDAS tool subsystems 1032–1038.

In another specific embodiment of novel fab management system 1000 (FIG. 10); wafer fab management software 1026 is partitioned between host work station 1020 and the individual EDAS tool subsystems 1032–1038. This partition is possible because some management tasks relate to EDAS data acquisition that are placed in the EDAS context of EDAS subsystems 1032–1038, rather than attempting to control EDAS data gathering via a more limited network connection such as network 1030.

The acquired EDAS data of wafer fab management system 1000 is maintained within individual EDAS tool subsystems 1032–1038, wherein the acquired EDAS information of each tool is stored on the tool subsystem mass storage devices 1066–1072. The database management function 1024 is also partitioned between the host work station 1020 and the tool subsystem data processing units 1058–1064. Database management function 1024 is partitioned because some portions of the database are more closely related to EDAS data acquisition, while the need to access that data from host work station 1020 can be handled via network connection 1030. Thus, those portions of the database management system most closely related to EDAS data collection are placed in a partition running on the tool subsystems' data processing units 1058–1064, and using the tool subsystems' mass storage device 1066–1072. The resulting distribution of portions of the system database among the host computer mass storage 1022 and the tool subsystems' mass storage devices 1066–1072 defines a networked, distributed database management system.

In a specific embodiment of the present invention, EDAS tool subsystems 1032–1038 include a wafer fab process endpoint determination subsystem interconnected with the tool subsystems via a primary port. The endpoint determination subsystem can be adapted for utilizing a plurality of tool sensors providing a plurality of EDAS sensor data, and correlating these data to improve the accuracy of the endpoint determination.

Figure 5:
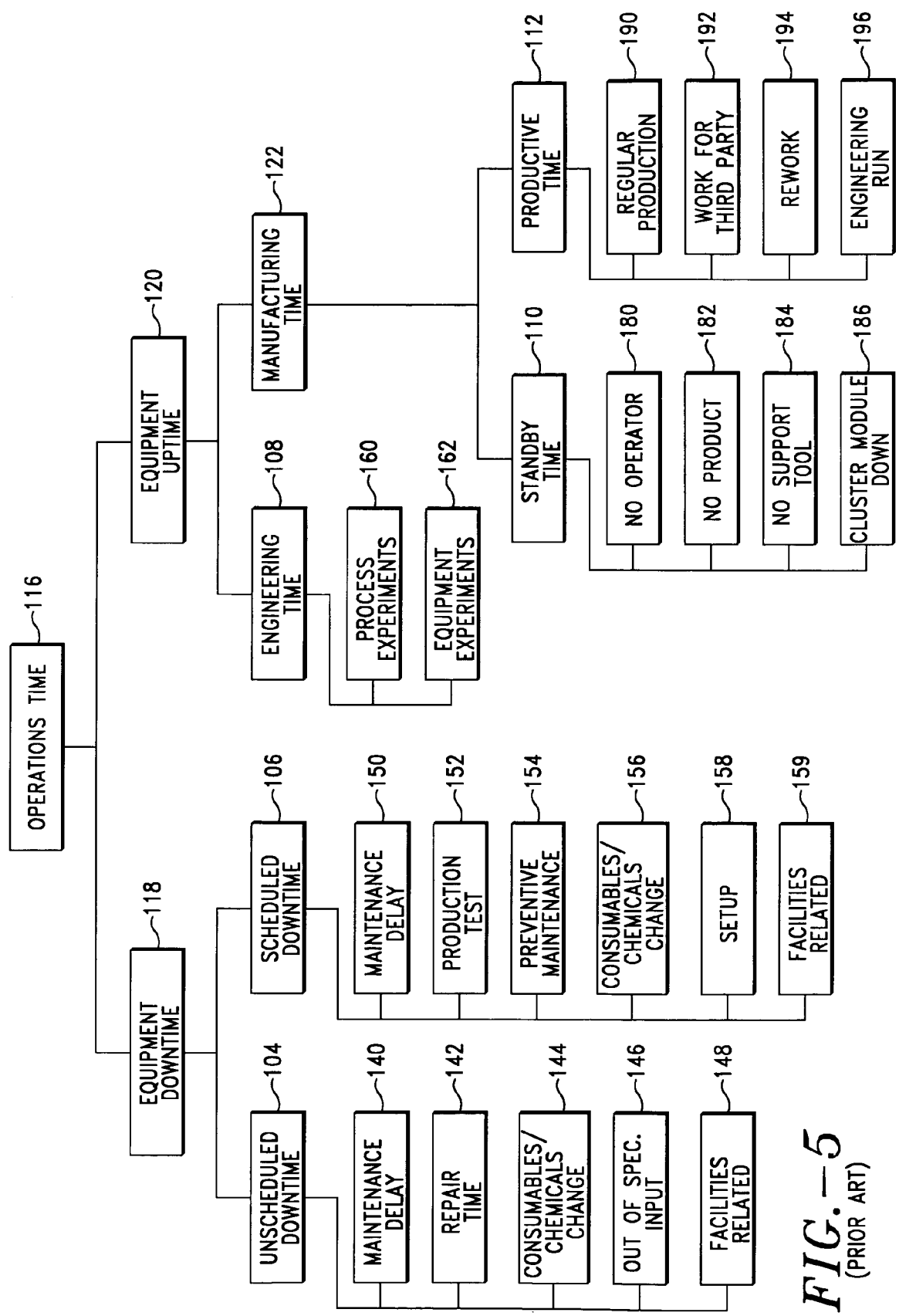
FIG. 5 is a block diagram schematically showing prior art equipment time states of the stack chart illustrated in FIG. 3.

Database management system 1024 (FIG. 10) includes the ability to analyze the data stored in the distributed database and to prepare reports in a number of formats including equipment states such as the SEMI E10-96 equipment states described in connection with FIGS. 3–5. The present invention provides a novel automatic reporting feature wherein E-10 states and for example equipment RAM are available to the operator at any time via a user interface. This feature is adapted for making tool maintenance schedules, tool diagnostic procedures and spare parts inventories available to the user at any time via a user interface using the distributed database of wafer fab management system 1000.

Wafer fab management software 1026 implements a user interface feature permitting management system 1000 to be responsive to appropriate user inputs for modifying the system configuration.

In a specific embodiment of novel wafer fab management system 1000, the wafer fab management software includes a set of security rules governing user access to the sensor data, distributed database and to the E10 equipment states. These security rules permit the users to be classified according to a predetermined hierarchy such that each user has an assigned security level within the hierarchy, and access is permitted under the security rules to the levels of the hierarchy on a need-to-know basis.

The database management function 1024 of novel management system 1000 provides the techniques necessary for analyzing selected data within the distributed database according to a predetermined plan. The selected data includes historical system data, data relating to a single tool, data relating to a single wafer, or to a single production run. The report generating features of the database management function 1024 are useful for reporting the results of such analysis via a user interface. Such reports include for example SPC related reports, tool performance data and chamber matching results.

Figure 11:
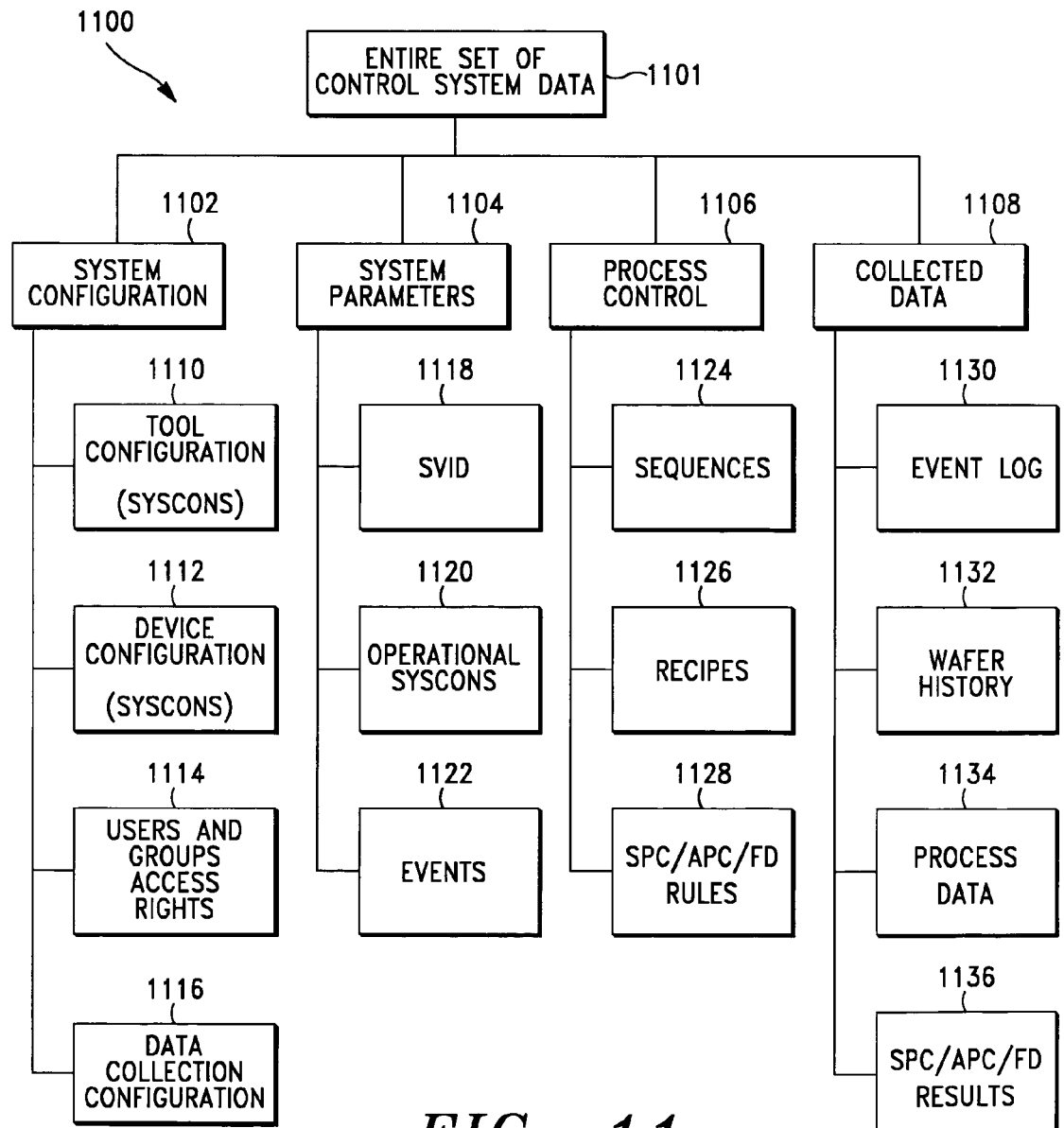
FIG. 11 is a block diagram illustrating hierarchical relationships between data objects of a computer executable process for operating a wafer fab system of the present invention.

An additional embodiment of the present invention, illustrated in FIG. 11, shows a novel hierarchical relationship system 1100 including hierarchical relationships between data objects of a computer executable process for operating one or more tools of a wafer fabrication system. An example of a computer executable process for a wafer fab includes the combination of DBMS 1024, wafer fab management software 1026, network interface 1028 and host computer 1020 of device 1000, depicted in FIG. 10. The diagram shown in FIG. 11 illustrates the types and subtypes of data objects (also referred to simply as "data") that the process gathers, creates, and handles while operating the tool. The diagram begins at the top with reference to the "entire set of control system data". This item is designated by the reference number 1101 and includes system configuration data 1102, system parameters 1104, process control data 1106, and collected (i.e. "gathered") data 1108. The system configuration data 1102 includes tool configuration data and parameters ("syscons" for "system constants") 1110, tool component device configuration data and parameters (also referred to as syscons) 1112, users and groups access rights data 1114, and data collection configuration data 1116. The systems parameters 1104 include SVID (status variable identifier) data 1118, operational syscons data 1120 ("syscons" is used interchangeably in a number of contexts; distinctions will be made when necessary to insure clarity of meaning), data and events data 1122. Process control data 1106 includes sequences 1124, recipes 1126, and SPC/APC (advanced process control)/FD (fault detection) rules 1128. The collected data 1108 includes event log data 1130, wafer history data 1132, process data 1134, and SPC/APC/FD results data 1136.

It is contemplated to use one or more tools (not shown) including a first communication port and a second communication port similar to primary and secondary ports 612 and 616 respectively of processing device 600, illustrated in FIG. 600. It is further contemplated to communicate process control data 1106, shown in FIG. 11, via the primary port to the tool and to communicate collected data from a tool sensor (not shown) to a data gathering unit or environment via the secondary port.

In order to provide the required functionality, the computer executable process (hereafter, simply the "control system") uses and collects the data illustrated in FIG. 11. The various types of data have much in common with each other. The following Table I describes some of the qualities these diverse data types share.

Table I

Control System Data Types

1. Data persistency: that is life beyond the scope of the process that created the data. For instance, the configuration data 1102 is saved between system loads; and an off-line analysis of saved process control data 1106 is useful for increasing throughput and decreasing the number of defective products by discovering and then correcting the reasons for the defects.

2. Data structure: most of the system data 1100 is not comprised of a single data type. Instead, each entity is described by its own, unique set of the attributes. For instance, any event is described by its number, string-description, type (alarm, warning, prompt or trace), and by the number and types of the event's parameters. To process events properly, all its related data is used as a whole.

3. Data interconnection and mutual interdependency: data describe real world entities and are therefore mutually interconnected. For instance, a current configuration 1102 defines valid SVID's 1118 that, in turn, influence possible data collection configuration 1116. Wafer history refers to logged events 1130, etc. Data interdependency becomes especially apparent when collected data 1108 are analyzed. In this case, in order to find the reason for a defect, all information associated with specific wafer for a lot must be found using links between data.

4. Constraints on data: that is restrictions that define valid values of data and are based on physical characteristics of the entities described by these data. for example, a negative date and zero K temperature are invalid and should not be supported. Referential integrity constraints reflect data interdependency. This type of constraints does not allow deleting data that is referred to by other data. Referential integrity also requires that mutual changes of specific data belonging to a larger set of similar data be consistent. For instance, if the recipe 1126 name has been changed, all sequences 1124 including this recipe should be also updated.

5. Data protection from unauthorized disclosure, alteration or destruction. Data are mission-critical because they influenced the tool functionality, and their improper modification may lead to a system crash. The loss of collected data may be even more critical.

6. Shared data: most data is used simultaneously by several functional modules.

The present invention is adapted for providing functionality that supports some or all the above data properties. The most suitable means for employing this functionality is to structure the entire set of control system data 1101 (FIG. 11) as a database. A database, when viewed as a data storage repository, includes an entire set of system data, their relationships and constraints on them that define correct database states. Databases are supported by a database management system (DBMS) which is software that provides services for accessing a database, while supporting data persistence, validity, consistency, non-redundancy, security, and the possibility to be shared. Database provides easy, powerful and flexible data storing, filtering, and searching. It simplifies data classification, comparison, and finding repeatability and irregularities in data. Database is not just a convenient way to control system data handling, it also significantly decreases the size of code. As a result, software reliability and fault-tolerance increases, and future code modifications become simpler to implement. DBMS provides means for implementation of a set of separate applications each supporting a part of the control system functionality. These applications access parts of database schema while sharing database data.

Figure 12:
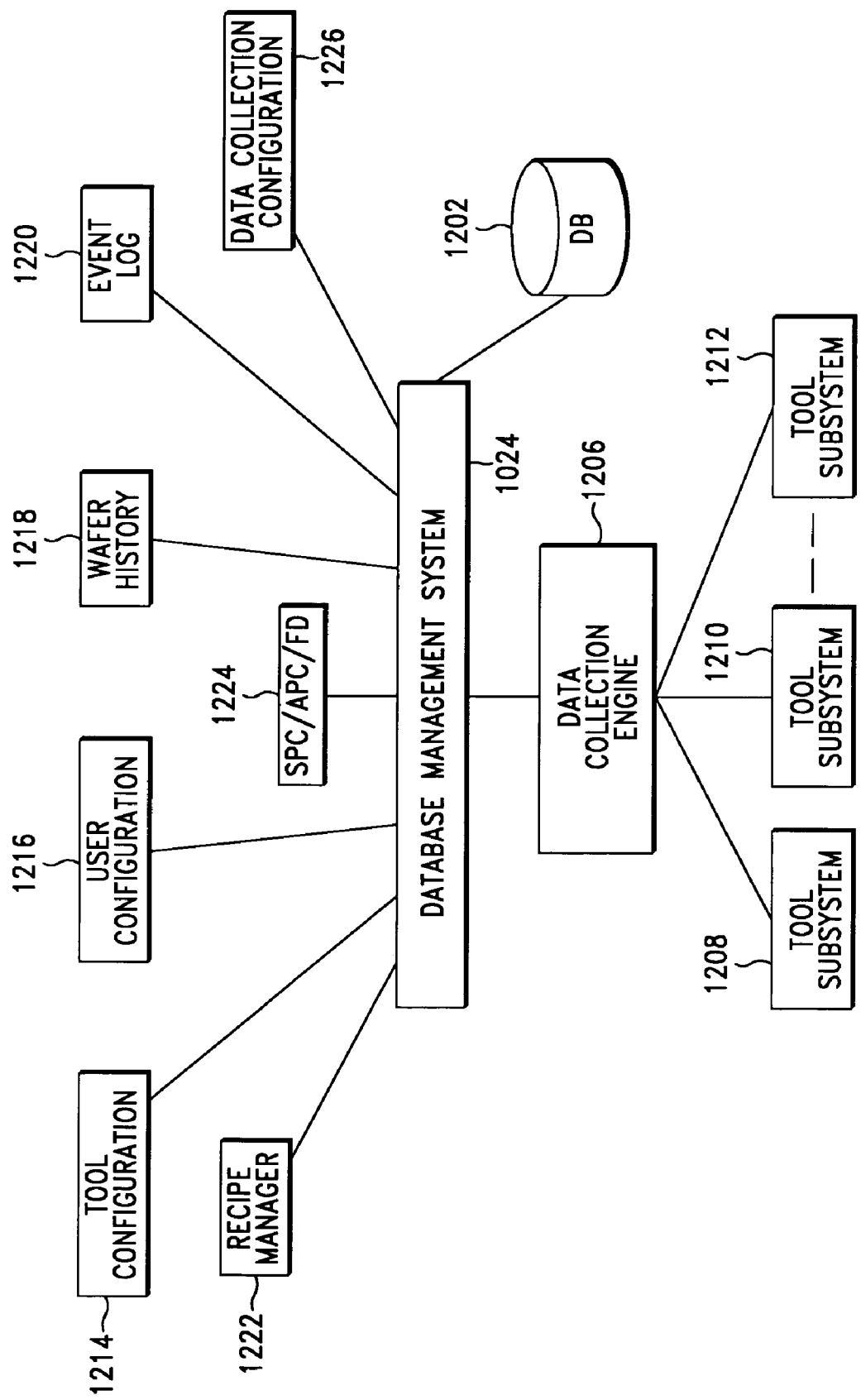
FIG. 12 is a block diagram illustrating a relationship between functional modules of a system for managing a wafer fab system of the present invention.

Another embodiment of the present invention, schematically illustrated in FIG. 12, shows a computer implemented control system 1200 for semiconductor fabricating. This system includes a database 1202, a database management system (DBMS) 1204, a data collection engine (data gathering) 1206, EDAS tool subsystems 1208, 1210, 1212 (similar to EDAS tool subsystems 1032–1038 of wafer fab management system 1000, illustrated in FIG. 10, a tool configuration application 1214, a user configuration application 1216, a wafer history application 1218, an event log application 1220, a recipe manager application 1222, an SPC/APC/FD application 1224, and a data collection application 1226. In a specific embodiment of the invention, the database and the applications reside on a dedicated PC, such as an NT front end. Applications that work with a conventional communication port, such as primary port 612 of device 600 (see FIG. 6), are accommodated into the new control system and continue to handle data as they have in the past. The new database maintains new data structures corresponding to the prior art data, and synchronizes the new values with the old by means of SECS II protocol messages. The applications are adapted for controlling semiconductor manufacturing.

The use of a database and database applications provide novel properties and features to the control system 1200. Among these are the following: (1) more convenient and easy data access because of support of data relationships and other data features discussed above; (2) remote access to data; (3) the ability to configure the tool, to edit recipes, to analyze collected data, etc., not only when legacy is active, but also when the tool is inactive; and (4) easier tools integration and an open interface for other software.

Another embodiment of the present invention, illustrated in FIG. 13, shows a functional database schema 1300 wherein data describe interrelated physical entities. Data are organized in relational tables, represented as rectangles in FIG. 13. Functional database schema 1300 includes the following tables: chamber model 1302, chamber variance 1304, current subsystem configuration 1306, subsystem 1308, device 1310, current device configuration 1312, soft version 1314, syscon bit 1316, syscon 1318, category 1320, parameter—SVID 1322, event 1324, event log 1326, unit 1328, event source 1330, user group 1332, wafer visit 1334, wafer history event log 1336, recipe 1338, step 1340, user 1342, application 1344, metrics 1346, trigger 1348, recipe summary 1350, step summary 1352, lot type 1354, session 1356, signal 1358, session log 1360, signal log 1362, process data description 1364, process data 1366, lot 1368, and wafer 1370.

Each application of computer implemented control system 1200 (FIG. 12) accesses one or more tables of functional database schema 1300 (FIG. 13). For example, the recipe manager 1222 of system 1200 provides recipe editing and searching of a specific recipe using some criteria, such as chamber model, user-creator, specific value of recipe parameter, etc. The recipe manager 1222 puts data directly into recipe 1338, and into recipe step 1340. These tables are used in turn by the wafer history application 1318 along with the tables for lot 1368, wafer 1370, recipe summary 1350, wafer visit 1334, wafer history event log 1336, and the lot type 1354. When the recipe summary 1350 is logged, the user can view the recipe's details.

Some tables of schema 1300 (FIG. 13), for instance recipe 1338, can be modified (edited) by the user, while others define "dictionaries". Dictionaries are tables that contain dictionary information and are identified with an asterisk in FIG. 13. Dictionary information is shipped as a part of release software and may not be modified. "Dictionary" information describes predefined knowledge about tool-lot types (for instance, processing engineering), the tool's subsystems (Mainframe, Chamber A, etc.) chamber models and variances, devices that may be configured to these types of chambers, and the like. Data separation allows the applications to work without changes in their code when new information appears. For instance, a new software baseline supports a new chamber variance. In this case, dictionaries are provided with pre-defined new records in corresponding tables (chamber variance and chamber model, if required). No change is needed in recipe manager code because there is no difference between a new record and old records.

As FIG. 13 shows, the data have complex relationships with several many-to-many ties. The tables themselves also have complex structure. This is especially true for the tables connected with configuration data. To avoid the necessity of changing the database structure because of a more detailed description of the configuration in the future, a special dictionary structure has been invented. In this new structure, two dedicated fields function as abstract "parent" and "child" rather than representing specific chamber or device attributes. Parent and child may describe any attribute of any entity. The attribute that was used as a child in the previous record may be the parent in the next record. It gives the possibility to include another entity with all its attributers in the same table. Starting from the same root, such branches of hierarchy as "AMAT?ChamberModel?CVD", "AMAT?Tool?ChamberA?Station#1?RF1", AMAT? Tool?ChamberB?GasPanel? Flow#2?MFC", etc. may be placed in the same table. Movement to the lowest level of hierarchy is realized not by the usual column-to-column and table-to-table jump, but via a record-to-record jump. Thus, any new level of configuration requires adding not a table column or a table, but just a new record to the dictionary. This approach eliminates the necessity to restructure the database schema.

To define many-to-many relationships between dictionary records, the dictionary is linked with a special table, its records describing correspondence of dictionary records to each other. This allows implementation of multidimensional hierarchy. This hierarchy encapsulates all functionality of the usual 2D-tree and provides a flexible mechanism that allows browsing the hierarchy from different points of view while starting from different points.

A database approach helps to fulfill current demands and a higher level of tools integration and statistical process control. Data-to-data separation from code, their structuring and DBMS support, implementation of more open and consistent software becomes possible. Taking care of data, their relationships, validity, consistency, providing concurrency mechanisms for data access, DBMS simplifies code and increases fault-tolerance. Data-oriented functionality (comparison, classification, search, etc.) may be implemented in an easier way and be more convenient for the user. By providing "open" data access for other software components, including third party applications, the database gives the possibility to implement new functionality regardless of the prior art software design. This makes possible the implementation of SPC/APC/FD that integrates smoothly with conventional code.

In another specific embodiment of a computer executable process for operating a wafer fabrication system, the process defines data structures and relationships between the defined data structures (the database schema of FIG. 13) for defining the wafer fabrication system. The process gathers system configuration information (1102 of FIG. 11), such as which tools are on-line and ready for operation, for selecting an appropriate model (1106 of FIG. 11) according to the tools actually present and operational. The process includes applications for informing a system operator of the existing system configuration, and response to operator inputs for altering the system configuration by activating/deactivating specific tools and peripheral devices. The process also includes a recipe (1126 of FIG. 11) permitting the model to be used to control the wafer fabrication system to obtain a desired result, e.g., the production of a specific integrated circuit type. Control of the system is achieved in one of two alternative ways. In a first alternative, the process generates alarms and reports permitting an operator to determine what intervention is required, and to manually effect the required control actions, such as shutting down a sub-process or adjusting a gas valve. In a second alternative, the process generates control signals that are transmitted to a tool or a peripheral device and are converted at the tool or peripheral device into electromechanical actions that effect the required control in a closed-loop manner.

The process of the present invention initiates operation of the wafer fabrication system according to the recipe, and then gathers operational data (1108 of FIG. 11) from the wafer fabrication system tools and peripherals while the etching process and related processes continue. The computer executable process formats and processes the gathered data to form the database defined data structures. The process uses the model and the formed data structures to control the wafer fabrication process, and continues gathering, modeling and controlling as the etch and related processes continue according to the recipe.

In another specific embodiment of the novel computer executable process for operating a wafer fabrication system, the process determines when a process endpoint is reached, and then uses one of the alternative control methods described above to terminate the process and to begin subsequent processes according to the appropriate sequences (1124 of FIG. 11). In yet another specific embodiment of the novel computer executable process for operating a wafer fabrication system, the computer executable process is partitioned between a first computer (908 of FIG. 9) on which the bulk of the process runs, and a second computer that handles the data gathering and processing operations on a plurality of such second computers, such as subsystems 902–906 (FIG. 9) and providing a communication function (e.g., the network 910 of FIG. 9) permitting the first computer of DBMS 908 to receive the gathered, formatted and processed operational data from the second computer 902.

In another specific embodiment of the novel computer executable process for operating a wafer fabrication system, the process extends the boundaries of the physical database beyond the single database (1202 of FIG. 12). In this embodiment the second computer (902 of FIG. 9) stores the data gathered at the tool-1 subsystem, and forwards to the first computer 908 only that data needed for the immediate needs of the process. This specific embodiment defines a networked, distributed database. In another specific embodiment of the novel computer executable process for operating a wafer fabrication system, the process extends the partition to include a plurality of second computers (902 906 of FIG. 9), each gathering data from a specific tool or set of tools and related peripherals. In this embodiment, each such second computer executes a copy of the same partition of the overall computer executable process. The partition provides for the gathering, formatting, processing, and storing of data from the specific tool set. In this specific embodiment, the communication function is extended to handle a plurality of data gathering streams from tool subsystems 902–906.

A novel fab tool employing the primary and secondary data communication ports of the present invention provides improved data communications with tool sensors because the ports enable the tool sensor to communicate messages, queries and data at a higher rate than a conventional tool equipped with a conventional (standard) communication port. The secondary port provides tools of the present invention with a novel data channel in addition to the conventional (standard) data channel, i.e. the primary port. The secondary port is particularly advantageous when it is capable of operating at a significantly higher baud rate than a conventional primary port.

In yet another specific embodiment of the novel computer executable process for operating a wafer fabrication system, the partition running on the first computer 908 includes a database management system application 908 for managing all the data gathering streams and insuring that the gathered data is consistent with the defined data structures. In this specific embodiment, the database management system 908 handles the responsibility for building the defined data structures from the gathered data streams 902–906. In another specific embodiment of the novel computer executable process for operating a wafer fabrication system the database management system 908 is assigned total responsibility for insuring that all data structures for the model are consistent with the defined structures, and that all relationships between the structures are enforced, and for protecting the data form improper access. In this specific embodiment, a partition of the database management function is executable by the second computers and has the same responsibility with respect to gathered data stored at each second computer. The communication function (network 910 of FIG. 9) is extended to permit the database management system to include the data stored at each second computer in a distributed database. Finally, in another specific embodiment of the novel computer executable process for operating a wafer fabrication system, the process is stored on a computer readable medium, such as a CD-Rom, DVD-ROM, and the like.

The invention has been described in terms of the preferred embodiment. One skilled in the art will recognize that it would be possible to construct the elements of the present invention from a variety of means and to modify the placement of components in a variety of ways. While the embodiments of the invention have been described in detail and shown in the accompanying drawings, it will be evident that various further modifications are possible without departing from the scope of the invention as set forth in the following claims.

We claim:

1. A method for processing data from a wafer fabricating chamber wherein the chamber includes at least one sensor, a first data communication port and a second data communication port, the method comprising:
   a) executing operational instructions to the chamber via the first port wherein the first port comprises a serial port communicating data at a maximum baud rate of about 19200 and wherein the first port includes an interface protocol supporting standard SECS II messages;
   b) operating the at least one sensor for sensing and then reporting sensor data; and
   c) communicating the sensor data to a computer implemented data acquisition process via the second port, wherein the second port comprises a serial port communicating data at a maximum baud rate of about 38400 and wherein the second port includes an interface protocol supporting messages comprising standard SECS II messages and custom SECS II messages.

2. A semiconductor processing device including a wafer fabricating chamber, the device comprising:
   a) a first data communication port, wherein the first port communicates computer executable messages to the chamber and wherein the first port comprises a first interface for communicating standard SECS II messages;
   b) a second data communication port, wherein the second port communicates computer executable messages to the chamber and wherein the second port comprises a second interface for communicating messages comprising standard SECS II messages and custom SECS II messages; and
   c) at least one sensor provided to the chamber for sensing and then reporting data selected from the group consisting of process data, product data and equipment parameter data, wherein the at least one sensor communicates with the second port.

3. A method for processing data from a wafer fabricating chamber wherein the chamber includes at least one sensor, a first data communication port and a second data communication port, the method comprising:
   a) executing operational instructions to the chamber via the first port, wherein the first port includes an interface protocol supporting standard SECS II messages;
   b) operating the at least one sensor for sensing and then reporting sensor data; and c) communicating the sensor data to a computer implemented data acquisition process via the second port, wherein the second port includes an interface protocol supporting custom SECS II messages.

4. A semiconductor processing device including a wafer fabricating chamber, the device comprising:
   a) a first data communication port, wherein the first port communicates computer executable messages to the chamber, and wherein the first port includes an interface protocol supporting standard SECS II messages;
   b) a second data communication port, wherein the second port communicates computer executable messages to the chamber and wherein the second port includes an interface protocol supporting custom SECS II messages; and
   c) at least one sensor provided to the chamber for sensing and then reporting data selected from the group consisting of process data, product data and equipment parameter data, wherein the at least one sensor communicates with the second port.

5. A method for processing data from a wafer fabricating chamber wherein the chamber includes a first data communication port and a second data communication port, the method comprising:
   a) executing operational instructions to the chamber via the first port, wherein the first port comprises a serial data communication port utilizing an interface protocol and wherein the first port comprises the serial port including an interface protocol supporting standard SECS II messages; and
   b) communicating data from the chamber to a computer implemented data acquisition process via the second port, wherein the second port comprises a serial data communication port utilizing an interface protocol, and wherein the second port comprises the serial port including an interface protocol supporting custom SECS II messages.

6. A semiconductor processing device including a wafer fabricating chamber, the device comprising:
   a) a first data communication port for communicating computer executable messages to the chamber, wherein the first port comprises a serial port including an interface protocol supporting standard SECS II messages; and
   b) a second data communication port for communicating computer executable messages to the chamber, wherein the second port comprises a serial port including an interface protocol supporting custom SECS II messages.

7. The device of claim 6 additionally comprising:
   a) a data acquisition subsystem;
   b) a data processing subsystem;
   c) an information processing and analyzing environment; and
   d) a decision making environment for determining whether the process is operating within predetermined control limits, wherein the decision making environment is adapted for activating an alarm.

8. The device of claim 7 additionally comprising the chamber having a sensor from which sensor data are communicated to the second port.

9. A semiconductor wafer fabricating chamber including at least one sensor, a first serial data communication port and a second serial data communication port, the chamber comprising:
   a) the at least one sensor positioned inside the chamber, wherein the sensor is adapted for providing sensor data;
   b) the first serial data communication port adapted for communicating computer executable messages including MES messages wherein the first port includes a first interface protocol supporting standard SECS II messages at a maximum baud rate of about 19200; and
   c) the second serial data communication port adapted for communicating data comprising enhanced data acquisition system data including sensor data, wherein the second port comprises a second interface protocol supporting messages including (i) standard SECS II messages and (ii) custom SECS II messages, wherein the second port operates at a maximum baud rate of about 38400.

* * * * *